US010116572B2

(12) United States Patent
Lv

(10) Patent No.: US 10,116,572 B2
(45) Date of Patent: Oct. 30, 2018

(54) METHOD, DEVICE, AND SYSTEM FOR ACQUIRING STREAMING MEDIA DATA

(71) Applicant: Huawei Technologies Co., Ltd., Shenzhen (CN)

(72) Inventor: Wei Lv, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 569 days.

(21) Appl. No.: 14/830,519

(22) Filed: Aug. 19, 2015

(65) Prior Publication Data

US 2015/0372927 A1 Dec. 24, 2015

Related U.S. Application Data

(63) Continuation of application No. PCT/CN2013/087063, filed on Nov. 13, 2013.

(30) Foreign Application Priority Data

Apr. 23, 2013 (CN) .......................... 2013 1 0143304

(51) Int. Cl.
*H04L 12/815* (2013.01)
*H04N 21/24* (2011.01)
(Continued)

(52) U.S. Cl.
CPC .......... *H04L 47/225* (2013.01); *H04L 65/608* (2013.01); *H04L 67/02* (2013.01);
(Continued)

(58) Field of Classification Search
CPC ......... H04N 21/2402; H04N 21/44209; H04N 21/4621; H04L 47/225; H04L 65/608; H04L 67/02
See application file for complete search history.

(56) References Cited

U.S. PATENT DOCUMENTS

2012/0265892 A1   10/2012   Ma et al.
2012/0278496 A1   11/2012   Hsu et al.
(Continued)

FOREIGN PATENT DOCUMENTS

CN   101420670   4/2009
CN   101848205   9/2010
(Continued)

OTHER PUBLICATIONS

Wang, Xin et al., "Contribution to DASH Core Experiment on Paramter Insertion in URL," International Organisation for Standardisation, Organisation Internationale De Normalisation, ISO/IEC JTC1/SC29/WG11, Coding of Moving Pictures and Audio, Geneva, Switzerland, Jan. 16, 2013, 6 pages.
(Continued)

*Primary Examiner* — Cheikh Ndiaye
(74) *Attorney, Agent, or Firm* — Slater Matsil, LLP

(57) ABSTRACT

The present invention discloses a method, a device, and a system for acquiring streaming media data. By performing a statistical analysis on historical information related to a streaming media service, which is recorded by at least one device of a terminal and a media content delivery device, bit rates suitable for downloading a streaming media file when different types of terminals access various types of networks are summarized, so that when performing a streaming media service, a terminal can directly request to acquire a streaming media file at a suitable bit rate without a need to attempt to download the streaming media file, starting from a lowest bit rate.

18 Claims, 5 Drawing Sheets

(51) Int. Cl.
H04N 21/442 (2011.01)
H04N 21/462 (2011.01)
H04L 29/06 (2006.01)
H04L 29/08 (2006.01)

(52) U.S. Cl.
CPC ... *H04N 21/2402* (2013.01); *H04N 21/44209* (2013.01); *H04N 21/4621* (2013.01)

(56) References Cited

U.S. PATENT DOCUMENTS

| | | |
|---|---|---|
| 2013/0007263 A1 | 1/2013 | Soroushian et al. |
| 2013/0080267 A1 | 3/2013 | McGowan |

FOREIGN PATENT DOCUMENTS

| | | |
|---|---|---|
| CN | 102088620 | 6/2011 |
| CN | 102710586 | 10/2012 |
| CN | 102984557 | 3/2013 |
| CN | 103248962 | 8/2013 |
| EP | 2426940 | 3/2012 |
| JP | 2011045134 A | 3/2011 |
| WO | 2008108379 A1 | 9/2008 |
| WO | 2011071913 | 6/2011 |
| WO | 2011125041 A2 | 10/2011 |

OTHER PUBLICATIONS

Wang, Xin et al., "On Server-Managed Adaptive Streaming in DASH," International Organisation for Standardisation, Organisation Internationale De Normalisation ISO/IEC/JTC1/SC29/WG11, Coding of Moving Pictures and Audio, Geneva, Switzerland, Jan. 20, 2013, 8 pages.

METHOD, DEVICE, AND SYSTEM FOR ACQUIRING STREAMING MEDIA DATA

This application is a continuation of International Application No. PCT/CN2013/087063, filed on Nov. 13, 2013, which claims priority to Chinese Patent Application No. 201310143304.9, filed on Apr. 23, 2013, both of which are hereby incorporated by reference in their entireties.

TECHNICAL FIELD

The present invention relates to a streaming media technology, and in particular, to a method, a device, and a system for acquiring streaming media data.

BACKGROUND

In recent years, Internet video services have developed rapidly, and traffic of video content has accounted for half of the entire Internet traffic. Speaking of the Internet video services, one has to mention a streaming media technology. It is the continuous development of the streaming media technology that fosters the rapid development of the current Internet video services. The current streaming media technology is mainly classified into two types: One is a connection-oriented streaming media technology represented by RTSP/RTP (Real Time Streaming Protocol/Real Time Transport Protocol); the other is a connectionless streaming media technology of HTTP (Hyper Text Transfer Protocol) progressive download that is currently used by mainstream video websites.

The RTSP/RTP streaming media technology is a peer-to-peer download technology based on a multicast application layer protocol, where RTP is used for transmitting streaming media data, and RTSP is used for collecting statistics on, managing, and controlling RTP transmission. The two work together and can significantly improve transmission efficiency of real-time network data. However, the RTSP/RTP streaming technology contains certain defects Logical implementation of the RTSP/RTP protocol stack is relatively complicated. Compared with the HTTP technology, it is relatively more difficult to implement hardware and software of a terminal that supports RTSP/RTP, which is especially obvious in an embedded terminal; in addition, a network port number (554) used in the RTSP protocol may be blocked by a firewall, NAT, and the like in some users' networks, and therefore cannot be used. Although RTSP may be configured, in a tunnel manner on some streaming servers, on HTTP port 80 for bearing, actual deployment is inconvenient.

The streaming media technology of HTTP progressive download means: An HTTP terminal may start to play streaming media data before an entire streaming media file is completely downloaded, and if both the HTTP terminal and a streaming media server support HTTP 1.1, the HTTP terminal may further select any time point in a part, which is not completely downloaded, to start media playback. Currently, mainstream video websites implement streaming media delivery in the HTTP progressive download manner.

Compared with the RTSP/RTP technology, the streaming media technology of HTTP progressive download uses the stateless HTTP protocol. When an HTTP terminal requests streaming media data from a streaming media server, the streaming media server delivers the requested streaming media data to the terminal; however, the streaming media server does not record a state of the terminal, and each request of the HTTP terminal is an independent one-time session.

As a simplest and original streaming media solution, a remarkable advantage of the HTTP progressive download solution is that only a Web server of one standard needs to be maintained, and installation and maintenance of the Web server are much easier and simpler than those of a dedicated streaming server in terms of workloads and complexity. However, disadvantages and defects are also obvious. Firstly, bandwidth is easy to be wasted. When an HTTP terminal plays content while downloading streaming media data from a streaming media server, if a user of the terminal chooses to stop watching before the content playing is completed, streaming media data that has been downloaded is a waste of a bandwidth resource. Secondly, HTTP-based progressive download is applied only to on-demand content and does not support live content.

In view of that, an HTTP Adaptive Streaming (hereinafter referred to as "HAS") technology that combines the RTSP/RTP streaming media technology and the streaming media technology of HTTP progressive download emerges accordingly. The HAS technology can greatly improve users' media playback experience while reducing technical complexity of a streaming media server; in addition, an HTTP-based transmission manner increases a penetrating capability of streaming media data in a network device. Currently, the HAS technology has become a development trend of the streaming media video industry.

A key of the HAS technology is to partition a streaming media file into segments, where each segment has a same time length, which is approximately 10 seconds. At a video coding layer, this means that each segment includes several complete video GOPs, and each segment has one key I frame, so as to ensure independence of each segment.

Segments may be separately encoded according to different bit rates, and segments with multiple bit rates are obtained. That is, a streaming media server locally stores streaming media files encoded at different bit rates, and streaming media files with same content may be encoded to obtain a streaming media file with a bit rate of 128 kbps, a streaming media file with a bit rate of 256 kbps, a streaming media file with a bit rate of 512 kbps, and the like. The streaming media server further provides an index file, where related information about the streaming media files with different bit rates is recorded in the index file. After downloading the index file from the streaming media server, a terminal requests, according to the information recorded in the index file, to download and play a streaming media file with a lowest bit rate. If a segment of the streaming media file with the lowest bit rate can be successfully downloaded and played, it indicates that a current terminal capability and a current network status can support the lowest bit rate, and the terminal attempts to request a streaming media file with a higher bit rate; if a segment of the streaming media file with the higher bit rate can also be successfully downloaded and played, the terminal continues to attempt to download a streaming media file with a still higher bit rate; if a segment of the streaming media file with the still higher bit rate cannot be successfully downloaded and played, the terminal continues to download and play the streaming media file with the lowest bit rate, and so on, until the terminal stabilizes the bit rate at a suitable one for downloading and playing a streaming media file.

An HAS technology based on HTTP Live Streaming (HTTP Live Streaming, HLS) is used as an example. A complete streaming media file is partitioned into multiple HTTP-based segments. When starting a streaming media session, a terminal first downloads, from a streaming media server, an extended M3U playlist file (that is, an index file, hereinafter referred to as a playlist file for short) that includes metadata. In HLS specifications, the playlist file is described as follows:

A playlist file is a text file that includes multiple individual lines, where each line is distinguished by a carriage return character or a line feed character, and each line records a URI and corresponding attribute information of a segment at a bit rate, where the attribute information includes:

BANDWIDTH: bandwidth, mandatory parameter that indicates bandwidth required for segment transmission at the bit rate;

PROGRAM-ID: this value is a decimal integer that uniquely identifies a particular description within the scope of the PlayList file;

CODECS: decoder information, optional parameter;

RESOLUTION: resolution, indicating resolution required for playing a segment at the bit rate on a terminal;

AUDIO: audio information, which is required to match a value of the "GROUP-ID" attribute in an "EXT-X-MEDIA" tag of an AUDIO type, and indicates audio information required for playing a segment at the bit rate on a terminal; and VIDEO: video information, which is required to match a value of the "GROUP-ID" attribute in an "EXT-X-MEDIA" tag of a VIDEO type, and indicates video information required for playing a segment at the bit rate on a terminal.

After downloading the playlist file from the streaming media server, the terminal downloads and plays, according to URIs (Uniform Resource Identifier, uniform resource identifier) that are of segments at different bit rates and are recorded in the playlist file, segments of the streaming media file in ascending order of bit rates until the terminal stabilizes the bit rate at a suitable one, and then the terminal continuously downloads and plays a streaming media file at the suitable bit rate.

In the foregoing streaming media data acquiring solution, according to the HLS specifications, it is suggested that the time length of each segment is approximately 10 seconds. When a streaming media file is being downloaded in ascending order of bit rates, the streaming media file downloaded in the first tens of seconds is streaming media data at a low bit rate. Streaming media data at a higher bit rate has richer image details, that is, better image quality; therefore, the streaming media data downloaded and played in the first tens of seconds according to the foregoing streaming media data acquiring solution has poor quality.

SUMMARY

Embodiments of the present invention provide a method, a device, and a system for acquiring streaming media data, which are used to resolve a problem in the prior art that streaming media data downloaded and played in the first tens of seconds has poor quality.

According to a first aspect, a method for acquiring streaming media data is provided, including: receiving a streaming media data transmission request from a terminal, where the transmission request carries a device type of the terminal and a network type of a network that the terminal accesses; determining, according to a determined bit rate for downloading a streaming media file when a terminal of each device type is in various types of networks that the terminal accesses, a bit rate for downloading a streaming media file when the terminal corresponding to the device type in the transmission request accesses the network corresponding to the network type in the transmission request; and sending the determined bit rate to the terminal to instruct the terminal to determine, according to an index file, an address of streaming media data encoded at the received bit rate and acquire the streaming media data. The bit rate for downloading a streaming media file when the terminal of each device type is in the various types of networks that the terminal accesses is determined according to record information that is of streaming media service execution and reported by each terminal, where the record information includes the device type of the terminal, the network type of the network that the terminal accesses, and the bit rate for the terminal to download a streaming media file.

With reference to the first aspect, in a first possible implementation manner, the method further includes: if it is determined, according to the record information, that bit rates for downloading a streaming media file are different when terminals of a same device type access networks of a same type, selecting a lowest bit rate among the bit rates.

With reference to the first aspect, in a second possible implementation manner, the record information further includes user account information; and the determining, according to the record information reported by each terminal, the bit rate for downloading a streaming media file when the terminal of each device type is in the various types of networks that the terminal accesses specifically includes: determining a bit rate for downloading a streaming media file by the terminal of each device type when the terminal applies various user account information in the various types of networks that the terminal accesses.

With reference to the first possible implementation manner of the first aspect, in a third possible implementation manner, the method further includes: if it is determined, according to the record information, that bit rates for downloading a streaming media file are different when terminals of a same device type access networks of a same type and apply same user account information, selecting a lowest bit rate among the bit rates.

With reference to the first aspect, in a fourth possible implementation manner, the record information further includes source information of a to-be-downloaded streaming media file; and the determining, according to the record information reported by each terminal, the bit rate for downloading a streaming media file when the terminal of each device type is in the various types of networks that the terminal accesses specifically includes: determining a bit rate for downloading a streaming media file, by the terminal of each device type, from a source corresponding to each piece of source information when the terminal is in the various types of networks that the terminal accesses.

With reference to the fourth possible implementation manner of the first aspect, in a fifth possible implementation manner, the method further includes: if it is determined, according to the record information, that bit rates for downloading a streaming media file by terminals of a same device type from a same source are different when the terminals access networks of a same type, selecting a lowest bit rate among the bit rates.

With reference to the first aspect, in a sixth possible implementation manner, the record information further includes start time and end time for downloading a streaming media file; and the determining, according to the record information reported by each terminal, the bit rate for downloading a streaming media file when the terminal of each device type is in the various types of networks that the terminal accesses specifically includes: determining a bit rate for downloading a streaming media file, by the terminal of each device type when the terminal is in the various types of networks that the terminal accesses, within a time segment represented by each start time and end time.

With reference to the sixth possible implementation manner of the first aspect, in a seventh possible implementation manner, the method further includes: if it is determined, according to the record information, that bit rates for downloading a streaming media file by terminals of a same device type within a same time segment are different when the terminals access networks of a same type, selecting a lowest bit rate among the bit rates.

With reference to the first aspect, in an eighth possible implementation manner, the record information further includes configuration information of a terminal; and the determining, according to the record information reported by each terminal, the bit rate for downloading a streaming media file when the terminal of each device type is in the various types of networks that the terminal accesses specifically includes: determining, in the case of each type of configuration information, a bit rate for downloading a streaming media file when the terminal of each device type is in the various types of networks that the terminal accesses.

With reference to the first possible implementation manner of the first aspect, the second possible implementation manner of the second aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner, the record information further includes downloading duration for downloading a streaming media file; and after the record information reported by the terminal is received, and before the bit rate for downloading a streaming media file when the terminal of each device type is in the various types of networks that the terminal accesses is determined, the method further includes: deleting record information that includes downloading duration less than a threshold.

With reference to the first possible implementation manner of the first aspect, the second possible implementation manner of the second aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a tenth possible implementation manner, the method further includes: receiving historical information that is of streaming media service execution within set duration and reported by a media content delivery device, where the historical information includes a device type of a terminal that executes a streaming media service, a network type of a network that the terminal accesses, and a bit rate for the terminal to download a streaming media file; and separately determining, according to the historical information, a bit rate for downloading a streaming media file when the terminal of each device type is in the various types of networks that the terminal accesses.

With reference to the tenth possible implementation manner of the first aspect, in an eleventh possible implementation manner, the historical information further includes user account information; and the determining, according to the historical information reported by the media content delivery device, a bit rate for downloading a streaming media file when the terminal of each device type is in the various types of networks that the terminal accesses specifically includes: determining a bit rate for downloading a streaming media file by the terminal of each device type when the terminal applies various user account information in the various types of networks that the terminal accesses.

With reference to the tenth possible implementation manner of the first aspect, in a twelfth possible implementation manner, the historical information further includes source information of a to-be-downloaded streaming media file; and the determining, according to the historical information reported by the media content delivery device, a bit rate for downloading a streaming media file when the terminal of each device type is in the various types of networks that the terminal accesses specifically includes: determining a bit rate for downloading a streaming media file, by the terminal of each device type, from a source corresponding to each piece of source information when the terminal is in the various types of networks that the terminal accesses.

With reference to the tenth possible implementation manner of the first aspect, in a thirteenth possible implementation manner, the historical information further includes start time and end time for downloading a streaming media file; and the determining, according to the historical information reported by the media content delivery device, a bit rate for downloading a streaming media file when the terminal of each device type is in the various types of networks that the terminal accesses specifically includes: determining a bit rate for downloading a streaming media file, by the terminal of each device type when the terminal is in the various types of networks that the terminal accesses, within a time segment represented by each start time and end time.

With reference to the tenth possible implementation manner of the first aspect, in a fourteenth possible implementation manner, the historical information further includes configuration information of a terminal; and the determining, according to the historical information reported by the media content delivery device, a bit rate for downloading a streaming media file when the terminal of each device type is in the various types of networks that the terminal accesses specifically includes: determining, in the case of each type of configuration information, a bit rate for downloading a streaming media file when the terminal of each device type is in the various types of networks that the terminal accesses.

With reference to the tenth possible implementation manner of the first aspect, the eleventh possible implementation manner of the first aspect, the twelfth possible implementation manner of the first aspect, the thirteenth possible implementation manner of the first aspect, or the fourteenth possible implementation manner of the first aspect, in a fifteenth possible implementation manner, the historical information further includes downloading duration for downloading a streaming media file; and after the historical information reported by the content delivery device is received, and before the bit rate for downloading a streaming media file when the terminal of each device type is in the various types of networks that the terminal accesses is determined according to the historical information, the method further includes deleting historical information that includes downloading duration less than a threshold.

With reference to the second possible implementation manner of the first aspect, in a sixteenth possible implementation manner, the transmission request further carries user account information; and the determining a bit rate for downloading a streaming media file when the terminal corresponding to the device type in the transmission request accesses the network corresponding to the network type in the transmission request specifically includes determining, according to the determined bit rate for downloading a streaming media file by the terminal of each device type when the terminal applies the various user account information in the various types of networks that the terminal accesses, a bit rate for downloading a streaming media file when the terminal corresponding to the device type in the transmission request accesses the network corresponding to the network type in the transmission request and applies the user account information in the transmission request.

With reference to the sixteenth possible implementation manner of the first aspect, in a seventeenth possible implementation manner, if a case in which the user account information in the transmission request is applied when the terminal corresponding to the device type in the transmission request accesses the network corresponding to the network type in the transmission request is not recorded in the determined bit rate for downloading a streaming media file by the terminal of each device type when the terminal applies the various user account information in the various types of networks that the terminal accesses, a bit rate for the user account information in the transmission request when a terminal of another device type accesses the network corresponding to the network type in the transmission request, or a bit rate for other user account information when the terminal corresponding to the device type in the transmission request accesses the network corresponding to the network type in the transmission request is determined.

With reference to the fourth possible implementation manner of the first aspect, in an eighteenth possible implementation manner, the transmission request further carries source information of a streaming media file; and the determining a bit rate for downloading a streaming media file when the terminal corresponding to the device type in the transmission request accesses the network corresponding to the network type in the transmission request specifically includes: determining, according to the determined bit rate for downloading a streaming media file by the terminal of each device type from the source corresponding to each piece of source information when the terminal is in the various types of networks that the terminal accesses, a bit rate for downloading a streaming media file when the terminal corresponding to the device type in the transmission request accesses the network corresponding to the network type in the transmission request and acquires a streaming media file from a source corresponding to the source information in the transmission request.

With reference to the sixth possible implementation manner of the first aspect, in a nineteenth possible implementation manner, the transmission request further carries current time; and the determining a bit rate for downloading a streaming media file when the terminal corresponding to the device type in the transmission request accesses the network corresponding to the network type in the transmission request specifically includes: determining, according to the determined bit rate for downloading a streaming media file, by the terminal of each device type when the terminal is in the various types of networks that the terminal accesses, within the time segment represented by each start time and end time, a bit rate for downloading a streaming media file within a time segment to which the current time belongs when the terminal corresponding to the device type in the transmission request accesses the network corresponding to the network type in the transmission request.

With reference to the eighth possible implementation manner of the first aspect, in a twentieth possible implementation manner, the transmission request further carries configuration information of a terminal; and the determining a bit rate for downloading a streaming media file when the terminal corresponding to the device type in the transmission request accesses the network corresponding to the network type in the transmission request specifically includes: determining, according to the determined bit rate for downloading a streaming media file when the terminal of each device type is in the various types of networks that the terminal accesses in the case of each type of configuration information, a bit rate for downloading a streaming media file when the terminal corresponding to the device type in the transmission request accesses, based on configuration corresponding to the configuration information in the transmission request, the network corresponding to the network type in the transmission request.

According to a second aspect, a method for acquiring streaming media data is provided, including: receiving a streaming media data transmission request from a terminal, where the transmission request carries a device type of the terminal and a network type of a network that the terminal accesses; determining, according to a determined bit rate for downloading a streaming media file when a terminal of each device type is in various types of networks that the terminal accesses, a bit rate for downloading a streaming media file when the terminal corresponding to the device type in the transmission request accesses the network corresponding to the network type in the transmission request; and sending the determined bit rate to the terminal to instruct the terminal to determine, according to an index file, an address of streaming media data encoded at the received bit rate and acquire the streaming media data; where the bit rate for downloading a streaming media file when the terminal of each device type is in the various types of networks that the terminal accesses is determined according to historical information that is of streaming media service execution and reported by a media content delivery device, where the historical information includes a device type of a terminal that execute a streaming media service, a network type of a network that the terminal accesses, and a bit rate for the terminal to download a streaming media file.

With reference to the second aspect, in a first possible implementation manner, the historical information further includes user account information; and the determining, according to the historical information reported by the media content delivery device, the bit rate for downloading a streaming media file when the terminal of each device type is in the various types of networks that the terminal accesses specifically includes: determining a bit rate for downloading a streaming media file by the terminal of each device type when the terminal applies various user account information in the various types of networks that the terminal accesses.

With reference to the second aspect, in a second possible implementation manner, the historical information further includes source information of a to-be-downloaded streaming media file; and the determining, according to the historical information reported by the media content delivery device, the bit rate for downloading a streaming media file when the terminal of each device type is in the various types of networks that the terminal accesses specifically includes: determining a bit rate for downloading a streaming media file, by the terminal of each device type, from a source corresponding to each piece of source information when the terminal is in the various types of networks that the terminal accesses.

With reference to the second aspect, in a third possible implementation manner, the historical information further includes start time and end time for downloading a streaming media file; and the determining, according to the historical information reported by the media content delivery device, the bit rate for downloading a streaming media file when the terminal of each device type is in the various types of networks that the terminal accesses specifically includes: determining a bit rate for downloading a streaming media file, by the terminal of each device type when the terminal is in the various types of networks that the terminal accesses, within a time segment represented by each start time and end time.

With reference to the second aspect, in a fourth possible implementation manner, the historical information further includes configuration information of a terminal; and the determining, according to the historical information reported by the media content delivery device, the bit rate for downloading a streaming media file when the terminal of each device type is in the various types of networks that the terminal accesses specifically includes: determining, in the case of each type of configuration information, a bit rate for downloading a streaming media file when the terminal of each device type is in the various types of networks that the terminal accesses.

With reference to the first possible implementation manner of the second aspect, the second possible implementation manner of the second aspect, the third possible implementation manner of the second aspect, or the fourth possible implementation manner of the second aspect, in a fifth possible implementation manner, the historical information further includes downloading duration for downloading a streaming media file; and after the historical information reported by the content delivery device is received, and before the bit rate for downloading a streaming media file when the terminal of each device type is in the various types of networks that the terminal accesses is determined according to the historical information, the method further includes deleting historical information that includes downloading duration less than a threshold.

With reference to the first possible implementation manner of the second aspect, in a sixth possible implementation manner, the transmission request further carries user account information; and the determining a bit rate for downloading a streaming media file when the terminal corresponding to the device type in the transmission request accesses the network corresponding to the network type in the transmission request specifically includes determining, according to the determined bit rate for downloading a streaming media file by the terminal of each device type when the terminal applies the various user account information in the various types of networks that the terminal accesses, a bit rate for downloading a streaming media file when the terminal corresponding to the device type in the transmission request accesses the network corresponding to the network type in the transmission request and applies the user account information in the transmission request.

With reference to the sixth possible implementation manner of the second aspect, in a seventh possible implementation manner, if a case in which the user account information in the transmission request is applied when the terminal corresponding to the device type in the transmission request accesses the network corresponding to the network type in the transmission request is not recorded in the determined bit rate for downloading a streaming media file by the terminal of each device type when the terminal applies the various user account information in the various types of networks that the terminal accesses, a bit rate for the user account information in the transmission request when a terminal of another device type accesses the network corresponding to the network type in the transmission request, or a bit rate for other user account information when the terminal corresponding to the device type in the transmission request accesses the network corresponding to the network type in the transmission request is determined.

With reference to the second possible implementation manner of the second aspect, in an eighth possible implementation manner, the transmission request further carries source information of a streaming media file; and the determining a bit rate for downloading a streaming media file when the terminal corresponding to the device type in the transmission request accesses the network corresponding to the network type in the transmission request specifically includes determining, according to the determined bit rate for downloading a streaming media file by the terminal of each device type from the source corresponding to each piece of source information when the terminal is in the various types of networks that the terminal accesses, a bit rate for downloading a streaming media file when the terminal corresponding to the device type in the transmission request accesses the network corresponding to the network type in the transmission request and acquires a streaming media file from a source corresponding to the source information in the transmission request.

With reference to the third possible implementation manner of the second aspect, in a ninth possible implementation manner, the transmission request further carries current time; and the determining a bit rate for downloading a streaming media file when the terminal corresponding to the device type in the transmission request accesses the network corresponding to the network type in the transmission request specifically includes: determining, according to the determined bit rate for downloading a streaming media file, by the terminal of each device type when the terminal is in the various types of networks that the terminal accesses, within the time segment represented by each start time and end time, a bit rate for downloading a streaming media file within a time segment to which the current time belongs when the terminal corresponding to the device type in the transmission request accesses the network corresponding to the network type in the transmission request.

With reference to the fourth possible implementation manner of the second aspect, in a tenth possible implementation manner, the transmission request further carries configuration information of a terminal; and the determining a bit rate for downloading a streaming media file when the terminal corresponding to the device type in the transmission request accesses the network corresponding to the network type in the transmission request specifically includes: determining, according to the determined bit rate for downloading a streaming media file when the terminal of each device type is in the various types of networks that the terminal accesses in the case of each type of configuration information, a bit rate for downloading a streaming media file when the terminal corresponding to the device type in the transmission request accesses, based on configuration corresponding to the configuration information in the transmission request, the network corresponding to the network type in the transmission request.

According to a third aspect, a method for acquiring streaming media data is provided, including: determining, by a terminal, a network type of a currently accessed network; determining, by the terminal according to a determined bit rate for downloading a streaming media file when each type of network is accessed, a bit rate for downloading a streaming media file in the currently accessed network, where the bit rate is determined by the terminal itself; determining, by the terminal from an index file, an address of streaming media data encoded at the bit rate for downloading a streaming media file in the currently accessed network; and acquiring, by the terminal, the streaming media data according to the determined address; where the terminal determines, according to record information of streaming media service execution, the bit rate for downloading a streaming media file when each type of network is accessed, where the record information includes a network type of a network that the terminal accesses and a bit rate for the terminal to download a streaming media file.

With reference to the third aspect, in a first possible implementation manner, the record information further includes user account information; and that the terminal determines, according to record information of streaming media service execution, the bit rate for downloading a streaming media file when each type of network is accessed specifically includes: separately determining, by the terminal based on each type of accessed network, a bit rate for downloading a streaming media file when various user account information is applied.

With reference to the third aspect, in a second possible implementation manner, the record information further includes source information of a to-be-downloaded streaming media file; and that the terminal determines, according to record information of streaming media service execution, the bit rate for downloading a streaming media file when each type of network is accessed specifically includes: separately determining, by the terminal based on each type of accessed network, a bit rate for downloading a streaming media file from a source corresponding to each piece of source information.

With reference to the third aspect, in a third possible implementation manner, the record information further includes start time and end time for downloading a streaming media file; and that the terminal determines, according to record information of streaming media service execution, the bit rate for downloading a streaming media file when each type of network is accessed specifically includes: separately determining, by the terminal based on each type of accessed network, a bit rate for downloading a streaming media file within a time segment represented by each start time and end time.

With reference to the third aspect, in a fourth possible implementation manner, the record information further includes configuration information of the terminal; and that the terminal determines, according to record information of streaming media service execution, the bit rate for downloading a streaming media file when each type of network is accessed specifically includes: separately determining, by the terminal, a bit rate for downloading a streaming media file when a terminal of each device type is in each type of network that the terminal accesses in the case of each type of configuration information.

With reference to the first possible implementation manner of the third aspect, the second possible implementation manner of the third aspect, the third possible implementation manner of the third aspect, or the fourth possible implementation manner of the third aspect, in a fifth possible implementation manner, the record information further includes downloading duration for downloading a streaming media file; and before the terminal determines, according to record information of streaming media service execution, the bit rate for downloading a streaming media file when each type of network is accessed, the method further includes deleting record information that includes downloading duration less than a threshold.

According to a fourth aspect, a bit rate determining device is provided, including an information receiving module, a bit rate storage module, a request receiving module, a bit rate determining module, and a bit rate sending module, where the information receiving module is configured to receive record information that is of streaming media service execution and reported by each terminal, where the record information includes a device type of the terminal, a network type of a network that the terminal accesses, and a bit rate for the terminal to download a streaming media file; the bit rate storage module is configured to store a bit rate for downloading a streaming media file when a terminal of each device type is in various types of networks that the terminal accesses, where the bit rate is determined according to the record information received by the information receiving module; the request receiving module is configured to receive a streaming media data transmission request from the terminal, where the transmission request carries a device type of the terminal and a network type of a network that the terminal accesses; the bit rate determining module is configured to determine, according to the bit rate stored in the bit rate storage module, a bit rate for downloading a streaming media file when the terminal corresponding to the device type in the transmission request accesses the network corresponding to the network type in the transmission request; and the bit rate sending module is configured to send the bit rate determined by the bit rate determining module to the terminal to instruct the terminal to determine, according to an index file, an address of streaming media data encoded at the received bit rate and acquire the streaming media data.

With reference to the fourth aspect, in a first possible implementation manner, the bit rate storage module is specifically configured to: if it is determined, according to the record information, that bit rates for downloading a streaming media file are different when terminals of a same device type access networks of a same type, select a lowest bit rate among the bit rates for storage.

With reference to the fourth aspect, in a second possible implementation manner, the information receiving module is specifically configured to: when the record information further includes downloading duration for downloading a streaming media file, delete record information that includes downloading duration less than a threshold.

With reference to the fourth aspect, in a third possible implementation manner, the information receiving module is specifically configured to receive the record information that further includes user account information; and the bit rate storage module is specifically configured to determine, according to the record information received by the information receiving module, a bit rate for downloading a streaming media file by the terminal of each device type when the terminal applies various user account information in the various types of networks that the terminal accesses, and store the bit rate.

With reference to the third possible implementation manner of the fourth aspect, in a fourth possible implementation manner, the bit rate storage module is specifically configured to: if it is determined, according to the record information, that bit rates for downloading a streaming media file are different when terminals of a same device type access networks of a same type and apply same user account information, select and store a lowest bit rate among the bit rates.

With reference to the fourth aspect, in a fifth possible implementation manner, the information receiving module is specifically configured to receive the record information that further includes source information of a to-be-downloaded streaming media file; and the bit rate storage module is specifically configured to determine, according to the record information received by the information receiving module, a bit rate for downloading a streaming media file, by the terminal of each device type, from a source corresponding to each piece of source information when the terminal is in the various types of networks that the terminal accesses, and store the bit rate.

With reference to the fifth possible implementation manner of the fourth aspect, in a six possible implementation manner, the bit rate storage module is specifically configured to: if it is determined, according to the record information, that bit rates for downloading a streaming media file by terminals of a same device type from a same source are different when the terminals access networks of a same type, select and store a lowest bit rate among the bit rates.

With reference to the fourth aspect, in a seventh possible implementation manner, the information receiving module is specifically configured to receive the record information that further includes start time and end time for downloading a streaming media file; and the bit rate storage module is specifically configured to determine, according to the record information received by the information receiving module, a bit rate for downloading a streaming media file, by the terminal of each device type when the terminal is in the various types of networks that the terminal accesses, within a time segment represented by each start time and end time, and store the bit rate.

With reference to the seventh possible implementation manner of the fourth aspect, in an eighth possible implementation manner, the bit rate storage module is specifically configured to: if it is determined, according to the record information, that bit rates for downloading a streaming media file by terminals of a same device type within a same time segment are different when the terminals access networks of a same type, select and store a lowest bit rate among the bit rates.

With reference to the fourth aspect, in a ninth possible implementation manner, the information receiving module is specifically configured to receive the record information that further includes configuration information of a terminal; and the bit rate storage module is specifically configured to determine, according to the record information received by the information receiving module, a bit rate for downloading a streaming media file when the terminal of each device type is in the various types of networks that the terminal accesses in the case of each type of configuration information.

With reference to the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, the eighth possible implementation manner of the fourth aspect, or the ninth possible implementation manner of the fourth aspect, in a tenth possible implementation manner, the information receiving module is further configured to receive historical information that is of streaming media service execution within set duration and reported by a media content delivery device, where the historical information includes a device type of a terminal that executes a streaming media service, a network type of a network that the terminal accesses, and a bit rate for the terminal to download a streaming media file; and the bit rate storage module is further configured to store a bit rate for downloading a streaming media file when the terminal of each device type is in the various types of networks that the terminal accesses, where the bit rate is determined according to the historical information.

With reference to the tenth possible implementation manner of the fourth aspect, in an eleventh possible implementation manner, the information receiving module is specifically configured to receive the historical information that further includes user account information; and the bit rate storage module is specifically configured to determine, according to the historical information received by the information receiving module, a bit rate for downloading a streaming media file by the terminal of each device type when the terminal applies various user account information in the various types of networks that the terminal accesses, and store the bit rate.

With reference to the tenth possible implementation manner of the fourth aspect, in a twelfth possible implementation manner, the information receiving module is specifically configured to receive the historical information that further includes source information of a to-be-downloaded streaming media file; and the bit rate storage module is specifically configured to determine, according to the record information received by the information receiving module, a bit rate for downloading a streaming media file, by the terminal of each device type, from a source corresponding to each piece of source information when the terminal is in the various types of networks that the terminal accesses, and store the bit rate.

With reference to the tenth possible implementation manner of the fourth aspect, in a thirteenth possible implementation manner, the information receiving module is specifically configured to receive the record information that further includes start time and end time for downloading a streaming media file; and the bit rate storage module is specifically configured to determine, according to the record information received by the information receiving module, a bit rate for downloading a streaming media file, by the terminal of each device type when the terminal is in the various types of networks that the terminal accesses, within a time segment represented by each start time and end time, and store the bit rate.

With reference to the tenth possible implementation manner of the fourth aspect, in a fourteenth possible implementation manner, the information receiving module is specifically configured to receive the historical information that further includes configuration information of a terminal; and the bit rate storage module is specifically configured to determine, according to the record information received by the information receiving module, a bit rate for downloading a streaming media file when the terminal of each device type is in the various types of networks that the terminal accesses in the case of each type of configuration information, and store the bit rate.

According to a fifth aspect, a bit rate determining device is provided, including an information receiving module, a bit rate storage module, a request receiving module, a bit rate determining module, and a bit rate sending module, where: the information receiving module is configured to receive historical information that is of streaming media service execution within set duration and reported by a media content delivery device, where the historical information includes a device type of a terminal that executes a streaming media service, a network type of a network that the terminal accesses, and a bit rate for the terminal to download a streaming media file; the bit rate storage module is configured to store a bit rate for downloading a streaming media file when a terminal of each device type is in various types of networks that the terminal accesses, where the bit rate is determined according to the historical information; the request receiving module is configured to receive a streaming media data transmission request from a terminal, where the transmission request carries a device type of the terminal and a network type of a network that the terminal accesses; the bit rate determining module is configured to determine, according to the bit rate stored in the bit rate storage module, a bit rate for downloading a streaming media file when the terminal corresponding to the device type in the transmission request accesses the network corresponding to the network type in the transmission request; and the bit rate sending module is configured to send the bit rate determined by the bit rate determining module to the terminal to instruct the terminal to determine, according to an index file, an address of streaming media data encoded at the received bit rate and acquire the streaming media data.

With reference to the fifth aspect, in a first possible implementation manner, when the historical information further includes downloading duration for downloading a streaming media file, the information receiving module is further configured to delete historical information that includes downloading duration less than a threshold.

With reference to the fifth aspect, in a second possible implementation manner, the information receiving module is specifically configured to receive the historical information that further includes user account information; and the bit rate storage module is specifically configured to determine, according to the historical information received by the information receiving module, a bit rate for downloading a streaming media file by the terminal of each device type when the terminal applies various user account information in the various types of networks that the terminal accesses, and store the bit rate.

With reference to the fifth aspect, in a third possible implementation manner, the information receiving module is specifically configured to receive the historical information that further includes source information of a to-be-downloaded streaming media file; and the bit storage storing module is specifically configured to determine, according to the record information received by the information receiving module, a bit rate for downloading a streaming media file, by the terminal of each device type, from a source corresponding to each piece of source information when the terminal is in the various types of networks that the terminal accesses, and store the bit rate.

With reference to the fifth aspect, in a fourth possible implementation manner, the information receiving module is specifically configured to receive the record information that further includes start time and end time for downloading a streaming media file; and the bit rate storage module is specifically configured to determine, according to the record information received by the information receiving module, a bit rates for downloading a streaming media file, by the terminal of each device type when the terminal is in the various types of networks that the terminal accesses, within a time segment represented by each start time and end time, and store the bit rate.

With reference to the fifth aspect, in a fifth possible implementation manner, the information receiving module is specifically configured to receive the historical information that further includes configuration information of a terminal; and the bit rate storage module is specifically configured to determine, according to the record information received by the information receiving module, a bit rate for downloading a streaming media file when the terminal of each device type is in the various types of networks that the terminal accesses in the case of each type of configuration information.

According to a six aspect, a terminal is provided, including a bit rate storage module, an information determining module, a bit rate determining module, and a streaming media data acquiring module, where: the bit rate storage module is configured to determine, according to record information of streaming media service execution, a bit rate for downloading a streaming media file when each type of network is accessed, and store the bit rate, where the record information includes a network type of a network that the terminal accesses and a bit rate for the terminal to download a streaming media file; the information determining module is configured to determine a network type of a currently accessed network; the bit rate determining module is configured to determine, according to the bit rate stored in the bit rate storage module, a bit rate for downloading a streaming media file in the currently accessed network; and the streaming media data acquiring module is configured to determine, from an index file, an address of streaming media data encoded at the bit rate determined by the bit rate determining module in the currently accessed network, and acquire the streaming media data according to the determined address.

With reference to the sixth aspect, in a first possible implementation manner, the bit rate storage module is specifically configured to: when the record information further includes user account information, separately determine, based on each type of accessed network, a bit rate for downloading a streaming media file when various user account information is applied, and store the bit rate.

With reference to the sixth aspect, in a second possible implementation manner, the bit rate storage module is specifically configured to: when the record information further includes source information of a to-be-downloaded streaming media file, separately determine, based on each type of accessed network, a bit rate for downloading a streaming media file from a source corresponding to each piece of source information.

With reference to the sixth aspect, in a third possible implementation manner, the bit rate storage module is specifically configured to: when the record information further includes start time and end time for downloading a streaming media file, separately determine, based on each type of accessed network, a bit rate for downloading a streaming media file within a time segment represented by each start time and end time, and store the bit rate.

With reference to the six aspect, in a fourth possible implementation manner, the bit rate storage module is specifically configured to: when the record information further includes configuration information of a terminal, separately determine a bit rate for downloading a streaming media file when a terminal of each device type is in each type of network that the terminal accesses in the case of each type of configuration information, and store the bit rate.

According to a seventh aspect, a system for acquiring streaming media data is provided, including a bit rate determining device and at least one terminal, where: the terminal is configured to: report record information of streaming media service execution to the bit rate determining device, after initiating a streaming media data transmission request to the bit rate determining device, receive a bit rate sent by the bit rate determining device, determine, according to an index file, an address of streaming media data encoded at the received bit rate, and acquire the streaming media data, where the record information includes a device type of the terminal, a network type of a network that the terminal accesses, and a bit rate for the terminal to download a streaming media file; and the bit rate determining device is configured to: determine, according to the record information, a bit rate for downloading a streaming media file when a terminal of each device type is in various types of networks that the terminal accesses; when receiving the streaming media data transmission request that carries a device type of the terminal and a network type of a network that the terminal accesses, determine, according to the determined bit rate for downloading a streaming media file when the terminal of each device type is in the various types of networks that the terminal accesses, a bit rate for downloading a streaming media file when the terminal corresponding to the device type in the transmission request accesses the network corresponding to the network type in the transmission request; and send the bit rate to the terminal.

With reference to the seventh aspect, in a first possible implementation manner, the system further includes a media content delivery device, where: the media content delivery device is configured to report, to the bit rate determining device, historical information of streaming media service execution within set duration, where the historical information includes a device type of a terminal that executes a streaming media service, a network type of a network that the terminal accesses, and a bit rate for the terminal to download a streaming media file; and the bit rate determining device is further configured to receive the historical information reported by the media content delivery device, and separately determine, according to the historical information, a bit rate for downloading a streaming media file when the terminal of each device type is in the various types of networks that the terminal accesses.

According to an eighth aspect, a system for acquiring streaming media data is provided, including a bit rate determining device, a media content delivery device, and at least one terminal, where: the media content delivery device is configured to report, to the bit rate determining device, historical information of streaming media service execution within set duration, where the historical information includes a device type of a terminal that executes a streaming media service, a network type of a network that the terminal accesses, and a bit rate for the terminal to download a streaming media file; the bit rate determining device is configured to: determine, according to the historical information, a bit rate for downloading a streaming media file when a terminal of each device type is in various types of networks that the terminal accesses; when receiving a streaming media data transmission request that carries a device type of the terminal and a network type of a network that the terminal accesses, determine, according to the determined bit rate for downloading a streaming media file when the terminal of each device type is in the various types of networks that the terminal accesses, a bit rate for downloading a streaming media file when the terminal corresponding to the device type in the transmission request accesses the network corresponding to the network type in the transmission request; and send the bit rate to the terminal; and the terminal is configured to: after initiating the streaming media data transmission request to the bit rate determining device; receive the bit rate sent by the bit rate determining device; determine, according to an index file, an address of streaming media data encoded at the received bit rate; and acquire the streaming media data.

According to a ninth aspect, a bit rate determining device is provided, including: a first air interface, a memory, a second air interface, a processor, and a distributor, where: the first air interface is configured to receive record information that is of streaming media service execution and reported by each terminal, where the record information includes a device type of the terminal, a network type of a network that the terminal accesses, and a bit rate for the terminal to download a streaming media file; the memory is configured to store a bit rate for downloading a streaming media file when a terminal of each device type is in various types of networks that the terminal accesses, where the bit rate is determined according to the record information received by the first air interface; the second air interface is configured to receive a streaming media data transmission request from the terminal, where the transmission request carries a device type of the terminal and a network type of a network that the terminal accesses; the processor is configured to determine, according to the bit rate stored in the memory, a bit rate for downloading a streaming media file when the terminal corresponding to the device type in the transmission request accesses the network corresponding to the network type in the transmission request; and the distributor is configured to send the bit rate determined by the processor to the terminal to instruct the terminal to determine, according to an index file, an address of streaming media data encoded at the received bit rate and acquire the streaming media data.

According to a tenth aspect, a bit rate determining device is provided, including: a first air interface, a memory, a second air interface, a processor, and a distributor, where: the first air interface is configured to receive historical information that is of streaming media service execution within set duration and reported by a media content delivery device, where the historical information includes a device type of a terminal that executes a streaming media service, a network type of a network that the terminal accesses, and a bit rate for the terminal to download a streaming media file; the memory is configured to store a bit rate for downloading a streaming media file when a terminal of each device type is in various types of networks that the terminal accesses, where the bit rate is determined according to the historical information; the second air interface is configured to receive a streaming media data transmission request from a terminal, where the transmission request carries a device type of the terminal and a network type of a network that the terminal accesses; the processor is configured to determine, according to the bit rate stored in the bit rate storage module, a bit rate for downloading a streaming media file when the terminal corresponding to the device type in the transmission request accesses the network corresponding to the network type in the transmission request; and the distributor is configured to send the bit rate determined by the bit rate determining module to the terminal to instruct the terminal to determine, according to an index file, an address of streaming media data encoded at the received bit rate and acquire the streaming media data.

According to an eleventh aspect, a terminal is provided, including a memory, a first processor, a second processor, and a downloader, where the memory is configured to determine, according to record information of streaming media service execution, a bit rate for downloading a streaming media file when each type of network is accessed, and store the bit rate, where the record information includes a network type of a network that the terminal accesses and a bit rate for the terminal downloading a streaming media file; the first processor is configured to determine a network type of a currently accessed network; the second processor is configured to determine, according to the bit rate stored in the memory, a bit rate for downloading a streaming media file in the currently accessed network; and the downloader is configured to determine, from an index file, an address of streaming media data encoded at the bit rate determined by the bit rate determining module in the currently accessed network, and acquire the streaming media data according to the determined address.

Embodiments of the present invention propose an adaptive bit rate solution based on statistics. By performing a statistical analysis on historical information related to a streaming media service, which is recorded by at least one device of a terminal and a media content delivery device, bit rates suitable for downloading a streaming media file when different types of terminals access various types of networks are summarized, so that when performing a streaming media service, a terminal can directly request to acquire a streaming media file at a suitable bit rate without a need to attempt to download the streaming media file, starting from a lowest bit rate. This avoids a problem of poor quality of streaming media data acquired in the first tens of seconds in an existing streaming media data acquiring solution, and ensures better quality of all streaming media data that is downloaded and played.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

Embodiments of the present invention propose an adaptive bit rate solution based on statistics. By performing a statistical analysis on historical information related to a streaming media service, which is recorded by at least one device of a terminal and a media content delivery device, a bit rate suitable for downloading a streaming media file when different types of terminals access various types of networks is summarized, so that when performing a streaming media service (for example, when a terminal requests to acquire streaming media data based on HLS), the terminal can directly request to acquire a streaming media file at the suitable bit rate without a need to attempt to download the streaming media file, starting from a lowest bit rate. This avoids a problem of poor quality of streaming media data acquired in the first tens of seconds in an existing streaming media data acquiring solution, and ensures better quality of all streaming media data that is downloaded and played.

The following describes in detail the solution provided in the embodiments of the present invention with reference to the accompanying drawings of this specification.

In the solution provided in the embodiments of the present invention, it is required to first obtain, by means of statistical analysis, a bit rate suitable for downloading a streaming media file when different types of terminals access various types of networks, so that a terminal may request a streaming media file at a corresponding bit rate according to the suitable bit rate. Therefore, the embodiments of the present invention include a bit rate determining process on a network side, a process of sending a determined suitable bit rate as a recommended value from the network side to a terminal, and a process of requesting a streaming media file by the terminal according to the suitable bit rate, which are described separately in the following.

Embodiment 1

Figure 1:
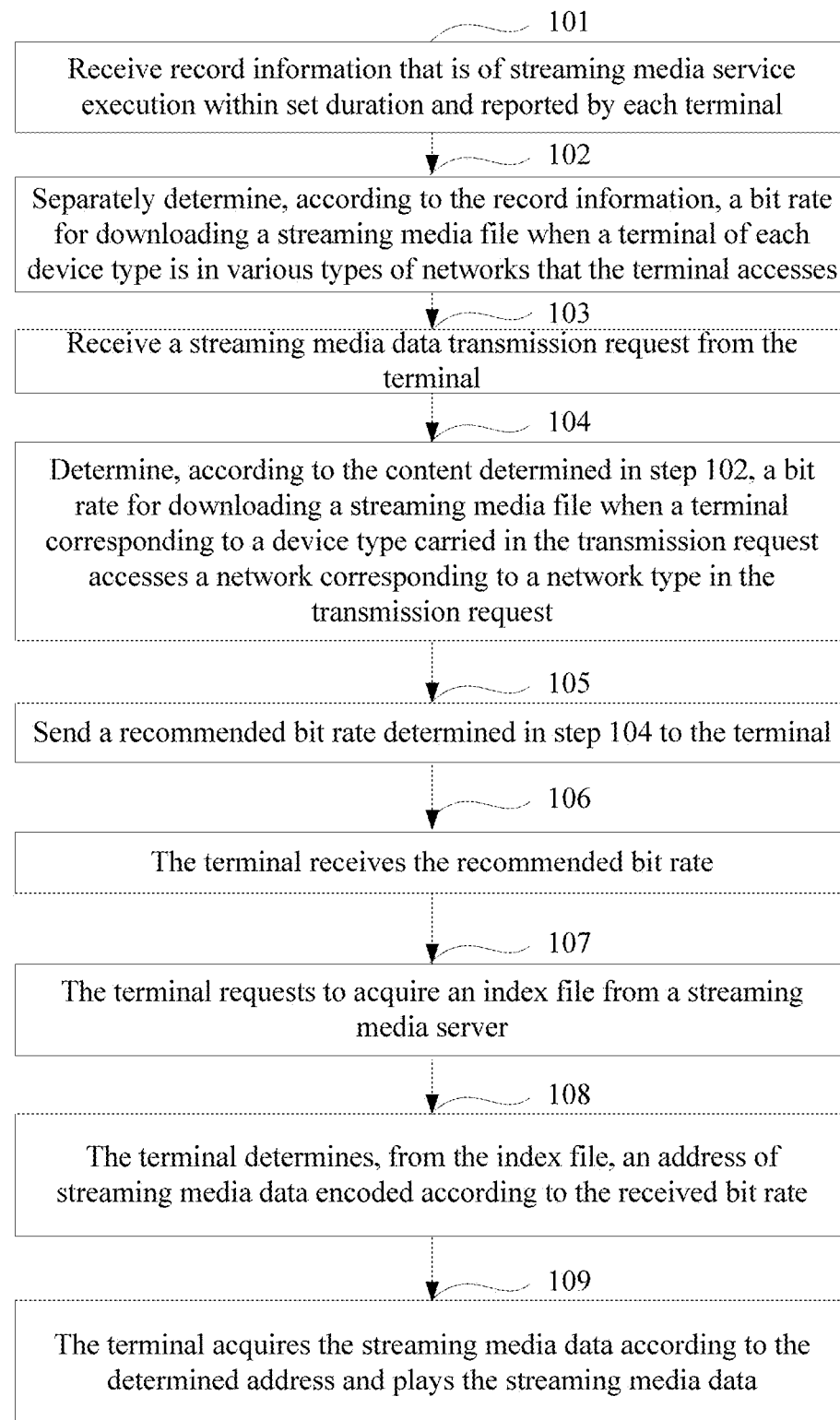
FIG. 1 is a schematic diagram of steps in a method for acquiring streaming media data according to Embodiment 1.

FIG. 1 is a schematic diagram of steps in a method for acquiring streaming media data according to Embodiment 1, and the method mainly includes the following steps:

Step 101: Receive record information that is of streaming media service execution within set duration and reported by each terminal.

The record information includes a device type of the terminal, a network type of a network that the terminal accesses, and a bit rate for the terminal to download a streaming media file.

In the solution of step 101, terminals that belong to a same EPG (electronic program guide) may regularly report record information generated locally to the EPG, and the terminal may also report record information each time after executing a streaming media service. This step may be executed by the EPG, and certainly, may also be executed by another network element on a network side.

The terminal may automatically generate a piece of record information each time when executing a streaming media service (for example, the terminal downloads and plays an HLS-based streaming media data service), where a network type of a network that the terminal accesses and a bit rate for downloading a streaming media file when the streaming media service is executed are recorded in the record information. Meanwhile, the terminal may also add a device type of the terminal to the record information.

The network type may be a network of a WLAN (Wireless LAN, wireless local area network) type or a cellular network; the device type of the terminal may be an Android type, or a Symbian type; the bit rate for downloading a streaming media file by the terminal may be 128 Kbps, 256 Kbps, 512 Kbps, or the like.

For example, five pieces of record information reported by three terminals are received as follows:

(1) a bit rate for downloading a streaming media file is 512 Kbps when an Android-type terminal A accesses the WLAN;

(2) a bit rate for downloading a streaming media file is 256 Kbps when the Android-type terminal A accesses the Cellular;

(3) a bit rate for downloading a streaming media file is 256 Kbps when an Android-type terminal B accesses the WLAN;

(4) a bit rate for downloading a streaming media file is 512 Kbps when a Symbian-type terminal C accesses the WLAN; and (5) a bit rate for downloading a streaming media file is 256 Kbps when the Symbian-type terminal C accesses the Cellular.

It should be noted that each piece of record information may further include downloading duration for downloading a streaming media file. In a conventional streaming media service, attempts are made to sequentially download and play streaming media data in ascending order of bit rates. Therefore, in a case in which the downloading duration is less than a threshold (for example, the downloading duration is less than 20 seconds), it may be considered that a current process of downloading a streaming media file is an attempted download, but not a stable download, and record information generated for the current downloading process may be ignored. For example, for record information that includes downloading duration less than 20 seconds, the terminal may not report the record information to the EPG, or the EPG deletes the record information, reported by the terminal, that includes the downloading duration less than 20 seconds.

Step 102: Separately determine, according to the record information, a bit rate for downloading a streaming media file when a terminal of each device type is in various types of networks that the terminal accesses.

Step 102 may be executed by the EPG, and may also be executed by another network element that can read the record information from the EPG and execute step 102.

Relationships between a device type, a network type, and a bit rate for downloading a streaming media file are separately recorded in each piece of record information received in step 101. Therefore, in step 102, by means of statistical analysis performed on each piece of record information, a correspondence between a combination of a device type and a network type and a bit rate for downloading a streaming media file may be determined.

The five pieces of record information in step 101 are still used as an example. For the Android-type terminals, the corresponding bit rates are 512 Kbps and 256 Kbps when the WLAN is accessed.

In particular, when terminals of a same type access networks of a same type, a case in which bit rates for downloading a streaming media file are different occurs. In the solution of this embodiment, a lower bit rate may be selected, that is, for the Android-type terminals, the corresponding bit rate is 256 Kbps when the WLAN is accessed. A purpose of doing this is as follows: When a terminal directly requests a streaming media file at a suitable bit rate, but not in ascending order of bit rates, if the requested bit rate is extremely high, the terminal cannot correctly download and play the streaming media file; selecting the lower bit rate may avoid a problem that the terminal cannot correctly download and play the streaming media file. Meanwhile, compared with an attempted downloading solution in ascending order of bit rates, the solution of this embodiment obtains better downloaded streaming media data.

A corresponding bit rate is 256 Kbps when an Android-type terminal accesses the Cellular;

a corresponding bit rate is 512 Kbps when a Symbian-type terminal accesses the WLAN; and a corresponding bit rate is 256 Kbps when a Symbian-type terminal accesses the Cellular.

According to the foregoing solution in step 101 and step 102, on the network side, statistics are collected on suitable bit rates for downloading a streaming media file when different types of terminals access various types of networks; then, when a terminal requests, to the network side, to perform a streaming media service, the network side may send a bit rate, as a recommended value, that matches a type of the terminal and an accessed network to the terminal.

Step 103: Receive a streaming media data transmission request from the terminal.

The transmission request carries a device type of the terminal and a network type of a network that the terminal accesses.

Step 103 may be executed by the EPG.

In step 103, when a terminal expects to execute a streaming media service, the terminal may initiate a streaming media data transmission request to the network side, where the transmission request may be an HTTP-based transmission data packet, and a device type of the terminal and a network type of a network that the terminal currently accesses are carried in a corresponding field in the data packet.

Step 104: Determine, according to the content determined in step 102, a bit rate for downloading a streaming media file when a terminal corresponding to a device type carried in the transmission request accesses a network corresponding to a network type in the transmission request.

For example, the terminal that initiates the streaming media data transmission request is an Android-type terminal D, and a network that the terminal D currently accesses is the WLAN; in this case, by querying the content determined in step 102, the terminal D may directly attempt to download a streaming media file at a bit rate of 256 Kbps, where the bit rate of 256 Kbps is a recommended bit rate.

Step 105: Send a recommended bit rate determined in step 104 to the terminal.

According to the foregoing solution of step 103 to step 105, when the terminal requests to perform streaming media data transmission, the network side recommends a suitable bit rate to the terminal according to a previous statistical result, and the terminal may directly download a streaming media file according to the received bit rate without a need to make download attempts in ascending order of bit rates.

Step 106: The terminal receives the recommended bit rate.

The example in step 104 is used again for description. When the Android-type terminal D accesses the WLAN, the recommended bit rate received is 256 Kbps.

Step 107: The terminal requests to acquire an index file from a streaming media server.

HLS is used as an example. The terminal may request to acquire a playlist file from the streaming media server.

It should be noted that an implementation sequence of step 107 is not limited in this embodiment. For step 107, it may be that the terminal requests the index file from the streaming media server after receiving the recommended bit rate, may also be that the terminal receives the recommended bit rate after requesting to acquire the index file from the streaming media server, and may further be that the terminal concurrently acquires the index file and receives the recommended bit rate.

Step 108: The terminal determines, from the index file, an address of streaming media data that is encoded according to the received bit rate.

URIs of segments at various bit rates, that is, addresses of streaming media data encoded according to various bit rates, are recorded in the index file. Therefore, when the bit rate received by the terminal is 256 Kbps, a URI of streaming media data encoded at 256 Kbps may be found in the index file.

Step 109: The terminal acquires the streaming media data according to the determined address and plays the streaming media data, so as to execute a streaming media service.

According to the foregoing solution in Embodiment 1, a terminal no longer makes download attempts in ascending order of bit rates in an index file; instead, bit rates recommended when different types of terminals access various networks are obtained by means of statistical analysis according to device types of terminals and types of accessed networks. Then, a bit rate that matches a device type of the terminal and a type of a currently accessed network is recommended to the terminal when the terminal requests to acquire streaming media data, and the terminal directly downloads a streaming media file according to the recommended bit rate. This avoids a problem of poor quality of streaming media data that is acquired upon a download attempt at a low bit rate, and can acquire and play high-quality streaming media data all the time, starting from a streaming media data download.

In the solution of Embodiment 1, a statistical analysis on bit rates is performed based on a device type of a terminal and a network type of an accessed network; preferably, the embodiments of the present invention are not limited thereto. On such a basis, a statistical analysis is further performed by using user account information, source information of a to-be-downloaded streaming media file, start time and end time for downloading a streaming media file, configuration information of a terminal, and other parameters, which is separately described in the following.

Embodiment 2

In Embodiment 2 of the present invention, a statistical analysis on bit rates is performed based on a device type of a terminal, a network type of an accessed network, and user account information, where the user account information refers to account information that is registered with a streaming media server and used to perform a streaming media service. A solution of Embodiment 2 is as follows:

Step one: Receive record information that is of streaming media service execution within set duration and reported by each terminal, where the record information includes a device type of the terminal, a network type of a network that the terminal accesses, user account information, and a bit rate for the terminal to download a streaming media file.

Different from Embodiment 1, in the solution of Embodiment 2, the user account information is added to the record information and used to represent a user account registered when a subscriber logs in to a streaming media server by using a terminal as a carrier.

The five pieces of record information in step 101 are still used as an example. In this embodiment, content of the five pieces of record information is as follows:

(1) for a subscriber Subscriber1, a bit rate for downloading a streaming media file is 512 Kbps when the terminal A that uses the Android type accesses the WLAN;

(2) for the subscriber Subscriber1, a bit rate for downloading a streaming media file is 256 Kbps when the terminal A that uses the Android type accesses the Cellular;

(3) for the subscriber Subscriber1, a bit rate for downloading a streaming media file is 256 Kbps when the terminal B that uses the Android type accesses the WLAN;

(4) for a subscriber Subscriber2, a bit rate for downloading a streaming media file is 512 Kbps when the terminal C that uses the Symbian type accesses the WLAN; and (5) for the subscriber Subscriber2, a bit rate for downloading a streaming media file is 256 Kbps when the terminal C that uses the Symbian type accesses the Cellular.

Similar to Embodiment 1, the record information may further include downloading duration for downloading a streaming media file, and record information that includes downloading duration less than a threshold may be ignored.

Step two: Determine a bit rate for downloading a streaming media file by the terminal of each device type when the terminal applies various user account information in the various types of networks that the terminal accesses.

In this step, statistics on a relationship between a bit rate and the three of a terminal, a network, and a user account are collected by using the received record information.

The record information received in the previous step is still used as an example, and a statistical result is as follows:

When an Android-type terminal accesses the WLAN and applies the subscriber Subscriber1, bit rates are 512 Kbps and 256 Kbps.

Similar to the particular case in step 102, a case in which bit rates for downloading a streaming media file are different occurs when terminals of a same type access networks of a same type and apply a same user account. In the solution of this embodiment, a lower bit rate may also be selected, that is, when the Android-type terminal accesses the WLAN and applies the subscriber Subscriber1, the bit rate is 256 Kbps.

When an Android-type terminal accesses the Cellular and applies the subscriber Subscriber1, a bit rate is 256 Kbps.

When a Symbian-type terminal accesses the WLAN and applies the subscriber Subscriber2, a bit rate is 512 Kbps.

When a Symbian-type terminal accesses the Cellular and applies the subscriber Subscriber2, a bit rate is 256 Kbps.

In the solution of the foregoing two steps, a network side separately collects statistics on suitable bit rates for downloading a streaming media file when different types of terminals access different types of networks and apply different user accounts. Afterward, the solution of Embodiment 2 may be similar to the solution of step 103 to step 109 in Embodiment 1. A difference is that in the solution of this embodiment, a transmission request reported by a terminal further carries user account information, which facilitates bit rate recommendation by using the statistical result in the second step.

For example, when the subscriber Subscriber1 uses an Android-type terminal that accesses the Cellular to initiate a streaming media data transmission request, 256 Kbps may be recommended to the terminal. Then, the terminal directly determines, from an index file, an address of streaming media data encoded at the bit rate of 256 Kbps, and acquires the streaming media data from the address.

In particular, in a case in which statistics have not been collected on a device type of a terminal that initiates a streaming media data transmission request and on an applied user account, reference may be made to a bit rate collected when the user account is applied on a terminal of another type and the bit rate is used as a recommended bit rate, or a bit rate collected when another subscriber is applied on the terminal of this type is used as a recommended value. Preferably, when the recommended bit rates obtained in the foregoing two manners are different, the lower one is selected.

For example, when the subscriber Subscriber2 uses the Android-type terminal that accesses the Cellular to initiate a streaming media data transmission request, which does not exist in the previous statistical result, reference may be made to the bit rate of 256 Kbps when the subscriber Subscriber2 uses the Symbian-type terminal that accesses the Cellular or the bit rate of 256 Kbps when the subscriber Subscriber1 uses the Android-type terminal that accesses the Cellular.

An entity for executing the steps in Embodiment 2 of the present invention is the same as that in Embodiment 1.

According to the solution of Embodiment 2 of the present invention, the statistical result is further specified based on effects of Embodiment 1, and in a same condition, a recommended bit rate obtained by a terminal that applies a user account with a high priority is higher than that obtained by a terminal that applies a user account with a low priority, so that a bit rate recommended to a terminal is more suitable for a currently requested streaming media service.

Embodiment 3

In Embodiment 3 of the present invention, a statistical analysis on bit rates is performed based on a device type of a terminal, a network type of an accessed network, and source information of a to-be-downloaded streaming media file, where the source information is a source of the to-be-downloaded streaming media file, such as a video website.

A solution of Embodiment 3 is as follows:

Step one: Receive record information that is of streaming media service execution within set duration and reported by each terminal, where the record information includes a device type of the terminal, a network type of a network that the terminal accesses, source information, and a bit rate for the terminal to download a streaming media file.

Different from Embodiment 1, in the solution of Embodiment 2, the source information is added to the record information.

The five pieces of record information in step 101 are still used as an example. In this embodiment, content of the five pieces of record information is as follows:

(1) a bit rate for downloading a streaming media file from a video website 1 is 512 Kbps when the Android-type terminal A accesses the WLAN;

(2) a bit rate for downloading a streaming media file from the video website 1 is 256 Kbps when the Android-type terminal A accesses the Cellular;

(3) a bit rate for downloading a streaming media file from the video website 1 is 256 Kbps when the Android-type terminal B accesses the WLAN;

(4) a bit rate for downloading a streaming media file from a video website 2 is 512 Kbps when the Symbian-type terminal C accesses the WLAN; and (5) a bit rate for downloading a streaming media file from the video website 2 is 256 Kbps when the Symbian-type terminal C accesses the Cellular.

Similar to Embodiment 1, the record information may further include downloading duration for downloading a streaming media file, and record information that includes downloading duration less than a threshold may be ignored.

Step two: Determine a bit rate for downloading a streaming media file, by the terminal of each device type, from a source corresponding to each piece of source information when the terminal is in the various types of networks that the terminal accesses.

In this step, statistics on a relationship between a bit rate and the three of a terminal, a network, and an information source are collected by using the received record information.

The record information received in the previous step is still used as an example, and a statistical result is as follows:

Bit rates for downloading a streaming media file from the video website 1 are 512 Kbps and 256 Kbps when an Android-type terminal accesses the WLAN.

Similar to the particular case in step 102, a case in which bit rates are different occurs when terminals of a same type access networks of a same type and download a streaming media file from a same source. In the solution of this embodiment, a lower bit rate may also be selected, that is, the bit rate for downloading a streaming media file from the video website 1 is 256 Kbps when the Android-type terminal accesses the WLAN.

A bit rate for downloading a streaming media file from the video website 1 is 256 Kbps when an Android-type terminal accesses the Cellular.

A bit rate for downloading a streaming media file from the video website 2 is 512 Kbps when a Symbian-type terminal accesses the WLAN.

A bit rate for downloading a streaming media file from the video website 2 is 256 Kbps when a Symbian-type terminal accesses the Cellular.

In the solution of the foregoing two steps, a network side separately collects statistics on suitable bit rates for downloading a streaming media file from different sources when different types of terminals access different types of networks. Afterward, the solution of Embodiment 3 may be similar to the solution of step 103 to step 109 in Embodiment 1. A difference is that in the solution of this embodiment, a transmission request reported by a terminal further carries source information, which facilitates bit rate recommendation by using the statistical result in the second step.

For example, when an Android-type terminal that accesses the Cellular requests to download a streaming media file from the video website 1, 256 Kbps may be recommended to the terminal. Then, the terminal directly determines, from an index file, an address of streaming media data encoded at the bit rate of 256 Kbps, and acquires the streaming media data from the address.

An entity for executing the steps in Embodiment 3 of the present invention is the same as that in Embodiment 1.

According to the solution of Embodiment 3 of the present invention, the statistical result is further specified based on effects of Embodiment 1, and in a same condition, a recommended bit rate obtained by a terminal that downloads a streaming media file from a video website that supports high bandwidth is higher than a recommended bit rate obtained by a terminal that downloads a streaming media file from a video website that supports low bandwidth, so that a bit rate recommended to a terminal is more suitable for a currently requested streaming media service.

Embodiment 4

The solutions of Embodiment 2 and Embodiment 3 are combined in Embodiment 4 to collect statistics on a relationship between a bit rate and the four of a terminal, a network, a user account, and a source, which is as follows:

Record information reported by a terminal includes a device type of the terminal, a network type of a network that the terminal accesses, user account information, source information of a to-be-downloaded streaming media file, and a bit rate for the terminal to download a streaming media file; then bit rates for downloading a streaming media file, by a terminal of each device type, from different sources when the terminal applies various user account information in various types of networks that the terminal accesses are determined.

The five pieces of record information involved in Embodiment 2 and Embodiment 3 are still used as an example, and content of the five pieces of record information is as follows:

(1) for the subscriber Subscriber1, a bit rate for downloading a streaming media file from the video website 1 is 512 Kbps when the terminal A that uses the Android type accesses the WLAN;

(2) for the subscriber Subscriber1, a bit rate for downloading a streaming media file from the video website 1 is 256 Kbps when the terminal A that uses the Android type accesses the Cellular;

(3) for the subscriber Subscriber1, a bit rate for downloading a streaming media file from the video website 1 is 256 Kbps when the terminal B that uses the Android type accesses the WLAN;

(4) for the subscriber Subscriber2, a bit rate for downloading a streaming media file from the video website 2 is 512 Kbps when the terminal C that uses the Symbian type accesses the WLAN; and (5) for the subscriber Subscriber2, a bit rate for downloading a streaming media file from the video website 2 is 256 Kbps when the terminal C that uses the Symbian type accesses the Cellular.

After a statistical analysis is performed on the five pieces of record information, an obtained result is as follows:

When an Android-type terminal accesses the WLAN and applies the subscriber Subscriber1, bit rates for downloading a streaming media file from the video website 1 are 512 Kbps and 256 Kbps.

Similar to the particular case in step 102, a case in which bit rates for downloading a streaming media file from a same source are different occurs when terminals of a same type access networks of a same type and apply a same user account. A lower bit rate may be selected, that is, when the Android-type terminal accesses the WLAN and applies the subscriber Subscriber1, the bit rate for downloading a streaming media file from the video website 1 is 256 Kbps.

When an Android-type terminal accesses the Cellular and applies the subscriber Subscriber1, a bit rate for downloading a streaming media file from the video website 1 is 256 Kbps.

When a Symbian-type terminal accesses the WLAN and applies the subscriber Subscriber2, a bit rate for downloading a streaming media file from the video website 2 is 512 Kbps.

When a Symbian-type terminal accesses the Cellular and applies the subscriber Subscriber2, a bit rate for downloading a streaming media file from the video website 2 is 256 Kbps.

Afterward, the solution of Embodiment 4 may be similar to the solution of step 103 to step 109 in Embodiment 1. A difference is that in the solution of this embodiment, a transmission request reported by a terminal further carries user account information and source information, which facilitates bit rate recommendation by using a statistical result.

For example, when the subscriber Subscriber1 uses an Android-type terminal that accesses the Cellular to request to download a streaming media file from the video website 1, 256 Kbps may be recommended to the terminal. Then, the terminal directly determines, from an index file, an address of streaming media data encoded at the bit rate of 256 Kbps, and acquires the streaming media data from the address.

An entity for executing the steps in Embodiment 4 of the present invention is the same as that in Embodiment 1.

The solution of Embodiment 4 of the present invention has effects of both Embodiment 2 and Embodiment 3.

Embodiment 5

In Embodiment 5 of the present invention, a statistical analysis on bit rates is performed based on a device type of a terminal, a network type of an accessed network, and start time and end time for downloading a streaming media file, and a streaming media file is downloaded within a time segment between the start time and the end time.

A solution of Embodiment 5 is as follows:

Step one: Receive record information that is of streaming media service execution within set duration and reported by each terminal, where the record information includes a device type of the terminal, a network type of a network that the terminal accesses, start time and end time for downloading a streaming media file, and a bit rate for the terminal to download a streaming media file.

Different from Embodiment 1, in the solution of Embodiment 5, the start time and the end time for downloading a streaming media file are added to the record information.

The five pieces of record information in step 101 are still used as an example. In this embodiment, content of the five pieces of record information is as follows:

(1) a bit rate for downloading a streaming media file from 20:00 to 20:30 is 512 Kbps when the Android-type terminal A accesses the WLAN;

(2) a bit rate for downloading a streaming media file from 20:00 to 20:30 is 256 Kbps when the Android-type terminal A accesses the Cellular;

(3) a bit rate for downloading a streaming media file from 20:00 to 20:30 is 256 Kbps when the Android-type terminal B accesses the WLAN;

(4) a bit rate for downloading a streaming media file from 07:00 to 08:00 is 512 Kbps when the Symbian-type terminal C accesses the WLAN; and (5) a bit rate for downloading a streaming media file from 07:00 to 08:00 is 256 Kbps when the Symbian-type terminal C accesses the Cellular.

Similar to Embodiment 1, a time segment between the start time and the end time in the record information that are for downloading a streaming media file is downloading duration of a streaming media file, and record information that includes downloading duration less than a threshold may be ignored.

Step two: Determine a bit rate for downloading a streaming media file, by the terminal of each device type when the terminal is in the various types of networks that the terminal accesses, within a time segment represented by each start time and end time.

In this step, statistics on a relationship between a bit rate and the three of a terminal, a network, and a downloading time segment are collected by using the received record information.

The record information received in the previous step is still used as an example, and a statistical result is as follows:

Bit rates for downloading a streaming media file within a time segment from 20:00 to 20:30 are 512 Kbps and 256 Kbps when an Android-type terminal accesses the WLAN.

Similar to the particular case in step 102, a case in which bit rates are different occurs when terminals of a same type access networks of a same type and download a streaming media file within a same time segment. In the solution of this embodiment, a lower bit rate may also be selected, that is, the bit rate for downloading a streaming media file within the time segment from 20:00 to 20:30 is 256 Kbps when the Android-type terminal accesses the WLAN.

A bit rate for downloading a streaming media file within the time segment from 20:00 to 20:30 is 256 Kbps when an Android-type terminal accesses the Cellular.

A bit rate for downloading a streaming media file within a time segment from 07:00 to 08:00 is 512 Kbps when a Symbian-type terminal accesses the WLAN.

A bit rate for downloading a streaming media file within the time segment from 07:00 to 08:00 is 256 Kbps when a Symbian-type terminal accesses the Cellular.

In the solution of the foregoing two steps, a network side separately collects statistics on suitable bit rates for downloading a streaming media file within different time segments when different types of terminals access different types of networks. Afterward, the solution of Embodiment 5 may be similar to the solution of step 103 to step 109 in Embodiment 1. A difference is that in the solution of this embodiment, a transmission request reported by a terminal further carries current time for downloading a streaming media file, which facilitates bit rate recommendation by using the statistical result in the second step after a time segment to which the current time belongs is determined.

For example, when an Android-type terminal that accesses the Cellular requests to start to download a streaming media file at 20:10, 256 Kbps may be recommended to the terminal because 20:10 belongs to the time segment from 20:00 to 20:30. Then, the terminal directly determines, from an index file, an address of streaming media data encoded at the bit rate of 256 Kbps, and acquires the streaming media data from the address.

According to the solution of Embodiment 5 of the present invention, the statistical result is further specified based on effects of Embodiment 1, and in a same condition, a recommended bit rate obtained by a terminal that downloads a streaming media file within an idle time segment (for example, from 07:00 to 08:00) of a service is higher than a recommended bit rate obtained by a terminal that downloads a streaming media file within a busy time segment (for example, from 20:00 to 20:30) of a service, so that a bit rate recommended to a terminal is more suitable for a currently requested streaming media service.

It should be noted that the solution of Embodiment 5 may be combined with the solutions of Embodiment 2, Embodiment 3, and Embodiment 4 separately. Detailed descriptions are as follows:

The solution of Embodiment 5 is combined with the solution of Embodiment 2 to collect statistics on a relationship between a bit rate and the four of a terminal, a network, a user account, and start time and end time for downloading a streaming media file. That is, record information reported by a terminal includes a device type of the terminal, a network type of a network that the terminal accesses, user account information, start time and end time for downloading a streaming media file, and a bit rate for the terminal to download a streaming media file; then bit rates for downloading a streaming media file, by a terminal of each device type, within different time segments when the terminal applies various user account information in various types of networks that the terminal accesses are determined.

The solution of Embodiment 5 is combined with the solution of Embodiment 3 to collect statistics on a relationship between a bit rate and the four of a terminal, a network, a source, and start time and end time for downloading a streaming media file. That is, record information reported by a terminal includes a device type of the terminal, a network type of a network that the terminal accesses, source information, start time and end time for downloading a streaming media file, and a bit rate for the terminal to download a streaming media file; then bit rates for downloading a streaming media file, by a terminal of each device type, from different sources within different time segments when the terminal is in various types of networks that the terminal accesses are determined.

The solution of Embodiment 5 is combined with the solution of Embodiment 4 to collect statistics on a relationship between a bit rate and the five of a terminal, a network, user account information, a source, and start time and end time for downloading a streaming media file. That is, record information reported by a terminal includes a device type of the terminal, a network type of a network that the terminal accesses, user account information, source information, start time and end time for downloading a streaming media file, and a bit rate for the terminal to download a streaming media file; then bit rates for downloading a streaming media file, by a terminal of each device type, from different sources within different time segments when the terminal applies different user accounts in various types of networks that the terminal accesses are determined.

An entity for executing of the steps in Embodiment 5 of the present invention is the same as that in Embodiment 1.

Embodiment 6

In Embodiment 6 of the present invention, a statistical analysis on bit rates is performed based on a device type of a terminal, a network type of an accessed network, and configuration information of the terminal. The configuration information may be software and hardware configuration information of the terminal, such as a software version number and a hardware capability value.

A solution of Embodiment 6 is as follows:

Step one: Receive record information that is of streaming media service execution within set duration and reported by each terminal, where the record information includes a device type of the terminal, a network type of a network that the terminal accesses, configuration information of the terminal, and a bit rate for the terminal to download a streaming media file.

Different from Embodiment 1, in the solution of this embodiment, the configuration information of the terminals is added to the record information.

The five pieces of record information in step 101 are still used as an example. In this embodiment, content of the five pieces of record information is as follows:

(1) when the Android-type terminal A accesses the WLAN, a bit rate for downloading a streaming media file is 512 Kbps, where a software version number of the terminal A is 4.0 version, and a screen size of the terminal A is 4 inches;

(2) when the Android-type terminal A accesses the Cellular, a bit rate for downloading a streaming media file is 256 Kbps, where the software version number of the terminal A is 3.0 version, and the screen size of the terminal A is 4 inches;

(3) when the Android-type terminal B accesses the WLAN, a bit rate for downloading a streaming media file is 256 Kbps, where a software version number of the terminal B is 3.0 version, and a screen size of the terminal B is 5 inches;

(4) when the Symbian-type terminal C accesses the WLAN, a bit rate for downloading a streaming media file is 512 Kbps, where a software version number of the terminal C is 4.0 version, and a screen size of the terminal C is 4 inches; and (5) when the Symbian-type terminal C accesses the Cellular, a bit rate for downloading a streaming media file is 256 Kbps, where the software version number of the terminal C is 4.0 version, and the screen size of the terminal C is 4 inches.

Similar to Embodiment 1, a time segment between start time and end time in the record information that are for downloading a streaming media file is downloading duration of a streaming media file, and record information that includes downloading duration less than a threshold may be ignored.

Step two: Determine, in the case of each type of configuration information, a bit rate for downloading a streaming media file by the terminal of each device type when the terminal is in the various types of networks that the terminal accesses.

In this step, statistics on a relationship between a bit rate and the three of a terminal, a network, and configuration information are collected by using the received record information.

The record information received in the previous step is still used as an example, and a statistical result is as follows:

When an Android-type terminal whose version number is 4.0 and whose screen size is 4 inches accesses the WLAN, a bit rate for downloading a streaming media file is 512 Kbps.

When an Android-type terminal whose version number is 3.0 and whose screen size is 4 inches accesses the Cellular, a bit rate for downloading a streaming media file is 256 Kbps.

When an Android-type terminal whose version number is 3.0 and whose screen size is 5 inches accesses the WLAN, a bit rate for downloading a streaming media file is 256 Kbps.

When a Symbian-type terminal whose version number is 4.0 and whose screen size is 4 inches accesses the WLAN, a bit rate for downloading a streaming media file is 512 Kbps.

When a Symbian-type terminal whose version number is 4.0 and whose screen size is 4 inches accesses the Cellular, a bit rate for downloading a streaming media file is 256 Kbps.

In the solution of the foregoing two steps, a network side separately collects statistics on suitable bit rates for downloading a streaming media file when different types of terminals access different types of networks in the case of different configuration. Afterward, the solution of Embodiment 6 may be similar to the solution of step 103 to step 109 in Embodiment 1. A difference is that in the solution of this embodiment, a transmission request reported by a terminal further carries configuration information of the terminal, which facilitates bit rate recommendation by using the statistical result in the second step after a current configuration condition of the terminal is determined.

According to the solution of Embodiment 6 of the present invention, the statistical result is further specified based on effects of Embodiment 1, and in a same condition, a terminal with higher configuration obtains a higher recommended bit rate, so that a bit rate recommended to a terminal is more suitable for a currently requested streaming media service.

It should be noted that the solution of Embodiment 6 may be combined with the solutions of Embodiment 2, Embodiment 3, Embodiment 4 and Embodiment 5 separately.

An entity for executing the steps in Embodiment 6 of the present invention is the same as that in Embodiment 1.

The solutions of Embodiment 1 to Embodiment 6 of the present invention are solutions in which a network side collects statistics on record information reported by a terminal managed on the network side. The embodiments of the present invention are also not limited to the following: A media content delivery device (for example, MDN (wide-area media content delivery device)) reports, to the network side, historical information generated each time when a streaming media service is executed within set duration, and after statistics on the received historical information are collected on the network side, a suitable bit rate is recommended to a terminal that initiates a streaming media data transmission request, which is described in the following.

Embodiment 7

In Embodiment 7 of the present invention, an MDN is used as an example to describe the following: Statistics on a bit rate for downloading a streaming media file when a terminal of each device type is in various types of networks that the terminal accesses are collected on a network side by using historical information reported by the MDN. Main content includes the following:

Step one: Receive historical information that is reported by the MDN and is generated each time when a streaming media service is executed within set duration.

The historical information includes a device type of a terminal that executes a streaming media service, a network type of a network that the terminal accesses, and a bit rate for the terminal to download a streaming media file.

It should be noted that the MDN may exchange streaming media services with multiple terminals within the set duration, and the MDN may generate one piece of historical information for the streaming media service each time. Preferably, each piece of historical information may further include downloading duration for downloading a streaming media file, and a case in which the downloading duration is less than a threshold may be ignored.

Step two: Separately determine, according to the historical information, a bit rate for downloading a streaming media file when the terminal of each device type is in the various types of networks that the terminal accesses.

A solution of Embodiment 7 is similar to the solution of Embodiment 1, and a difference is that in this embodiment, the historical information is sent by the MDN to an EPG.

Similar to Embodiment 2, Embodiment 3, Embodiment 4, Embodiment 5, and Embodiment 6, the historical information in this embodiment may further include one type of or a combination of multiple types of user account information, source information of a to-be-downloaded streaming media file, start time and end time for downloading a streaming media file, and configuration information of a terminal, and statistics are collected on newly included information combined with the device type and the network type in Embodiment 7. Details are not described herein again.

In Embodiment 7, statistics are collected on a historical record reported by the MDN. Because the historical record reported by the MDN is not easy to be tampered with, a statistical result obtained by using the solution of Embodiment 7 is highly reliable.

Preferably, Embodiment 1 to Embodiment 6 may further be combined with Embodiment 7 in the embodiments of the present invention, and record information reported by a terminal and the historical information reported by the MDN are combined on the network side to collect statistics, so as to recommend a suitable bit rate to the terminal. On the one hand, the record information reported by the terminal may be a complement to such a condition in which a video website such as YouTube whose service is not provided by the MDN; on the other hand, the historical information reported by the MDN may be a complement to such a condition in which the terminal may not be able to promptly report the record information to the network side due to mobility of the terminal, so as to complete a statistical result.

In particular, when different bit rates are obtained by means of statistics collection according to the record information and the historical information in a same condition, the bit rate obtained according to the record information prevails. A statistical result obtained according to the historical information is used as a complement to a solution of obtaining a bit rate according to the record information.

According to the solutions of Embodiment 1 to Embodiment 7, the network side (EPG for example) performs a statistical analysis on information reported by at least one device of a terminal and the MDN, and then recommends a suitable bit rate to a terminal that initiates a streaming media data transmission request. Because there is plenty of resource information used for statistics collection, a statistical result that includes a combination of multiple cases may be obtained, and for a case in which statistics are not collected, reference may be made to similar result.

Preferably, in the solutions of Embodiment 1 to Embodiment 7, the network side may generate a statistical list according to the obtained statistical result, where the statistical list records suitable bit rates for downloading a streaming media file when different types of terminals access various types of networks (if a statistical analysis is further performed on one or more types of user account information, source information of a to-be-downloaded streaming media file, start time and end time for downloading a streaming media file, and configuration information of a terminal, a corresponding item is added to the statistical list), and the network side actively sends the statistical list to a terminal that is served currently. The terminal reads the received statistical list when the terminal needs to request to download a streaming media file, and selects a suitable bit rate according to an actual situation of the terminal.

The solutions of the embodiments of the present invention are also not limited to the following: A terminal performs a statistical analysis on record information generated locally. Details are described in the following.

Embodiment 8

Figure 2:
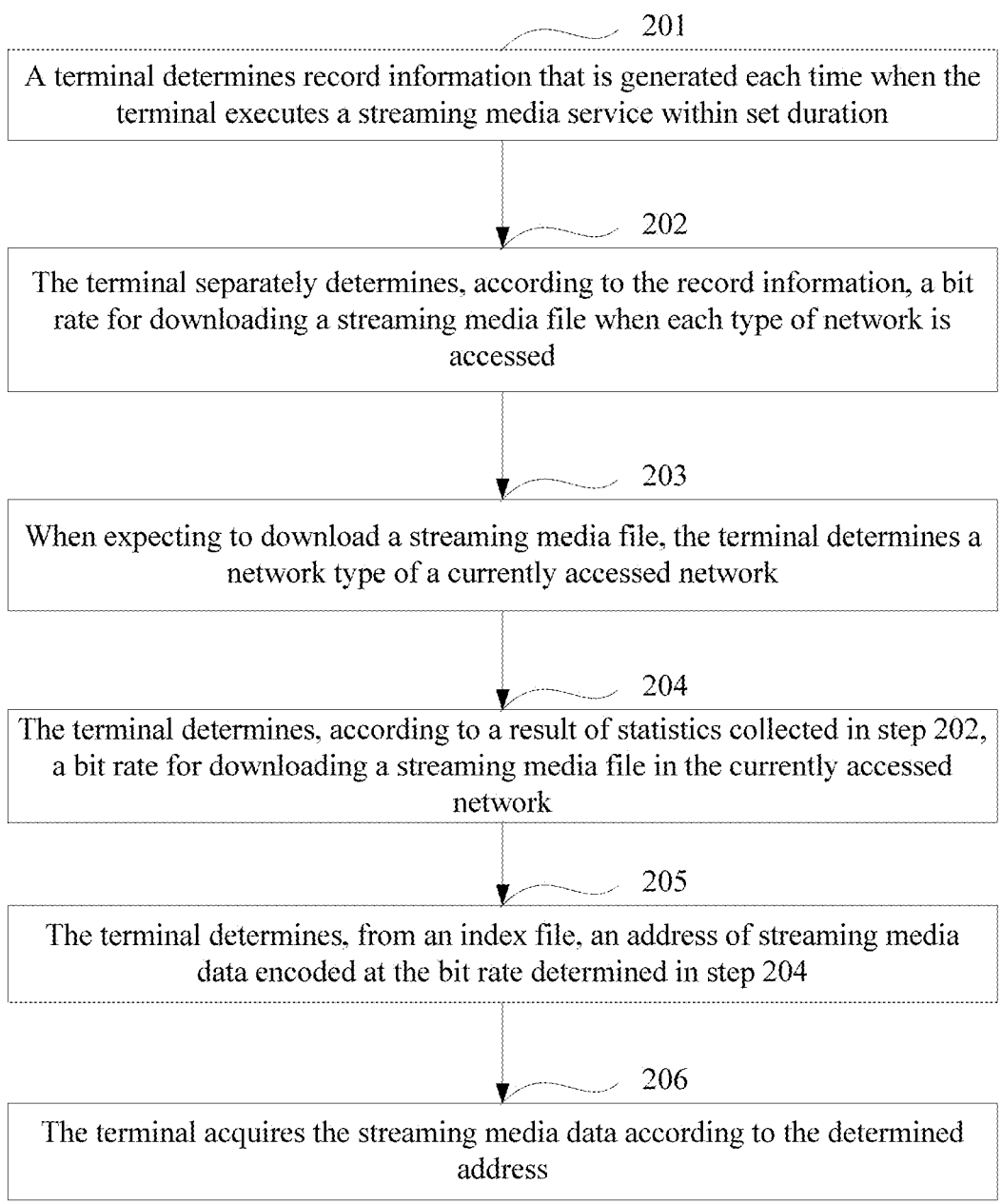
FIG. 2 is a schematic diagram of steps in a method for acquiring streaming media data according to Embodiment 8.

A solution of Embodiment 8 of the present invention is a solution in which a terminal collects statistics on bit rates and then selects a suitable bit rate for downloading a streaming media file. As shown in FIG. 2, the following steps are included:

Step 201: A terminal determines record information that is generated each time when the terminal executes a streaming media service within set duration.

The record information includes a network type of a network that the terminal accesses and a bit rate for the terminal to download a streaming media file.

The terminal may generate record information each time when the terminal executes a streaming media service, and use all record information generated within the set duration for statistics collection. Similar to the solution of step 101 in Embodiment 1, each piece of record information may further include downloading duration for downloading a streaming media file, and a case in which the downloading duration is less than a threshold may be ignored.

For example, three pieces of record information generated by the terminal within the set duration are as follows:

(1) when a WLAN is accessed, a bit rate for downloading a streaming media file is 512 Kbps;

(2) when Cellular is accessed, a bit rate for downloading a streaming media file is 256 Kbps; and (3) when the Cellular is accessed, a bit rate for downloading a streaming media file is 128 Kbps.

Step 202: The terminal separately determines, according to the record information, a bit rate for downloading a streaming media file when each type of network is accessed.

A result of statistics collected by the terminal on the three pieces of record information in step 201 is as follows:

(1) when the WLAN is accessed, the bit rate for downloading a streaming media file is 512 Kbps; and (2) when the Cellular is accessed, the bit rate for downloading a streaming media file is 128 Kbps.

Similar to the solution of Embodiment 1, a case in which bit rates for downloading a streaming media file are different occurs when networks of a same type are accessed, and a lower bit rate may be selected, so as to avoid a problem that a streaming media file cannot be correctly downloaded and played because the terminal selects an extremely high bit rate.

Step 203: When expecting to download a streaming media file, the terminal determines a network type of a currently accessed network.

Step 204: The terminal determines, according to a result of statistics collected in step 202, a bit rate for downloading a streaming media file in the currently accessed network.

Step 205: The terminal determines, from an index file, an address of streaming media data encoded at the bit rate determined in step 204.

Step 206: The terminal acquires the streaming media data according to the determined address.

Similar to Embodiment 2 to Embodiment 6, the record information of the terminal in Embodiment 8 may further include one type of or a combination of multiple types of user account information, source information of a to-be-downloaded streaming media file, start time and end time for downloading a streaming media file, and configuration information of the terminal, and statistics are collected on newly included information combined with the network type in Embodiment 8. Details are not described herein again.

As opposed to effects obtained in Embodiment 1, according to the solution of Embodiment 8, when a terminal requests to download a streaming media file, the terminal may further directly determine a suitable bit rate according to a result of statistics collected by the terminal. In this case, the terminal can determine the suitable bit rate by the terminal without a need to obtain the suitable bit rate by means of recommendation from a network side, which simplifies a process in which the terminal acquires a recommended bit rate from the network side, and improves efficiency of performing a streaming media service by the terminal.

Embodiment 9

Figure 3:
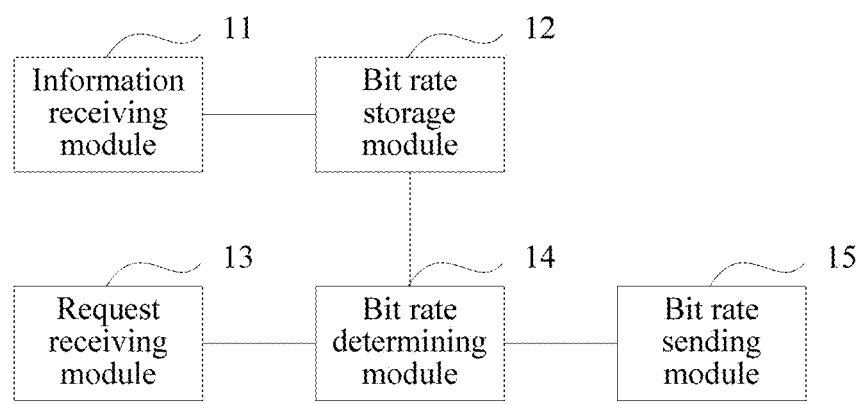
FIG. 3 is a schematic structural diagram of a bit rate determining device according to Embodiment 9.

In Embodiment 9 of the present invention, a bit rate determining device that is based on a same invention idea as Embodiment 1 is further provided. As shown in FIG. 3, the device includes: an information receiving module 11, a bit rate storage module 12, a request receiving module 13, a bit rate determining module 14, and a bit rate sending module 15, where:

the information receiving module 11 is configured to receive record information that is of streaming media service execution and reported by each terminal, where the record information includes a device type of the terminal, a network type of a network that the terminal accesses, and a bit rate for the terminal to download a streaming media file;

the bit rate storage module 12 is configured to store a bit rate for downloading a streaming media file when a terminal of each device type is in various types of networks that the terminal accesses, where the bit rate is determined according to the record information received by the information receiving module;

the request receiving module 13 is configured to receive a streaming media data transmission request from the terminal, where the transmission request carries a device type of the terminal and a network type of a network that the terminal accesses;

the bit rate determining module 14 is configured to determine, according to the bit rate stored in the bit rate storage module 12, a bit rate for downloading a streaming media file when the terminal corresponding to the device type in the transmission request accesses the network corresponding to the network type in the transmission request; and the bit rate sending module 15 is configured to send the bit rate determined by the bit rate determining module to the terminal to instruct the terminal to determine, according to an index file, an address of streaming media data encoded at the received bit rate and acquire the streaming media data.

Preferably, the bit rate storage module 12 is specifically configured to: if it is determined, according to the record information, that bit rates for downloading a streaming media file are different when terminals of a same device type access networks of a same type, select a lowest bit rate among the bit rates for storage.

The record information further includes downloading duration for downloading a streaming media file. In this case, the information receiving module 11 is specifically configured to: after receiving the record information reported by the terminal, delete record information that includes downloading duration less than a threshold.

In Embodiment 9 of the present invention, a statistical analysis on bit rates is performed based on a device type of a terminal and a network type of an accessed network. In Embodiment 9, on such a basis, a statistical analysis may further be performed by using user account information, source information of a to-be-downloaded streaming media file, start time and end time for downloading a streaming media file, configuration information of a terminal, and other parameters; and a bit rate recommended to the terminal is determined according to the solutions of Embodiment 2 to Embodiment 6, which are separately described in the following.

(1) A case in which the record information further includes the user account information.

The information receiving module 11 is specifically configured to receive the record information that further includes the user account information.

The bit rate storage module 12 is specifically configured to determine, according to the record information received by the information receiving module, a bit rate for downloading a streaming media file by the terminal of each device type when the terminal applies various user account information in the various types of networks that the terminal accesses, and store the bit rate.

Preferably, the bit rate storage module 12 is specifically configured to: if it is determined, according to the record information, that bit rates for downloading a streaming media file are different when terminals of a same device type access networks of a same type and apply same user account information, select and store a lowest bit rate among the bit rates.

(2) A case in which the record information further includes the source information of a to-be-downloaded streaming media file.

The information receiving module 11 is specifically configured to receive the record information that further includes the source information of a to-be-downloaded streaming media file.

The bit rate storage module 12 is specifically configured to determine, according to the record information received by the information receiving module, a bit rate for downloading a streaming media file, by the terminal of each device type, from a source corresponding to each piece of source information when the terminal is in the various types of networks that the terminal accesses, and store the bit rate.

Preferably, the bit rate storage module 12 is specifically configured to: if it is determined, according to the record information, that bit rates for downloading a streaming media file by terminals of a same device type from a same source are different when the terminals access networks of a same type, select and store a lowest bit rate among the bit rates.

(3) A case in which the record information further includes the start time and the end time for downloading a streaming media file.

The information receiving module 11 is specifically configured to receive the record information that further includes the start time and the end time for downloading a streaming media file.

The bit rate storage module 12 is specifically configured to determine, according to the record information received by the information receiving module, a bit rate for downloading a streaming media file, by the terminal of each device type when the terminal is in the various types of networks that the terminal accesses, within a time segment represented by each start time and end time, and store the bit rate.

Preferably, the bit rate storage module 12 is specifically configured to: if it is determined, according to the record information, that bit rates for downloading a streaming media file by terminals of a same device type within a same time segment are different when the terminals access networks of a same type, select and store a lowest bit rate among the bit rates.

(4) A case in which the record information further includes the configuration information of a terminal.

The information receiving module 11 is specifically configured to receive the record information that further includes the configuration information of a terminal.

The bit rate storage module 12 is specifically configured to determine, according to the record information received by the information receiving module, a bit rate for downloading a streaming media file when the terminal of each device type is in the various types of networks that the terminal accesses in the case of each type of configuration information.

The foregoing solutions from (1) to (4) may be randomly combined together. The bit rate storage module 12 may perform a statistical analysis on bit rates of terminals in various cases according to a variety of information and store the bit rates.

In the foregoing solutions, the bit rate determining device performs a statistical analysis on bit rates of terminals in various cases according to record information reported by the terminals. In the solution of this embodiment, the bit rate determining device may further perform a statistical analysis on bit rates of terminals in various cases according to historical information reported by a media content delivery device. Detailed descriptions are as follows:

The information receiving module 11 is further configured to receive historical information that is of streaming media service execution within set duration and reported by the media content delivery device, where the historical information includes a device type of a terminal that executes a streaming media service, a network type of a network that the terminal accesses, and a bit rate for the terminal to download a streaming media file.

The bit rate storage module 12 is further configured to store a bit rate for downloading a streaming media file when the terminal of each device type is in the various types of networks that the terminal accesses, where the bit rate is determined according to the historical information.

Preferably, when the historical information further includes downloading duration for downloading a streaming media file, the information receiving module 11 is further configured to delete historical information that includes downloading duration less than a threshold.

Similar to the foregoing solutions from (1) to (4), the historical information may further include user account information, source information of a to-be-downloaded streaming media file, start time and end time for downloading a streaming media file, and configuration information of a terminal, which are separately described in the following.

(5) A case in which the historical information further includes the user account information.

The information receiving module 11 is specifically configured to receive the historical information that further includes the user account information.

The bit rate storage module 12 is specifically configured to determine, according to the historical information received by the information receiving module, a bit rate for downloading a streaming media file by the terminal of each device type when the terminal applies various user account information in the various types of networks that the terminal accesses, and store the bit rate.

Preferably, the bit rate storage module 12 is specifically configured to: if it is determined, according to the historical information, that bit rates for downloading a streaming media file are different when terminals of a same device type access networks of a same type and apply same user account information, select and store a lowest bit rate among the bit rates.

(6) A case in which the historical information further includes the source information of a to-be-downloaded streaming media file.

The information receiving module 11 is specifically configured to receive the historical information that further includes the source information of a to-be-downloaded streaming media file.

The bit rate storage module 12 is specifically configured to determine, according to the record information received by the information receiving module, a bit rate for downloading a streaming media file, by the terminal of each device type, from a source corresponding to each piece of source information when the terminal is in the various types of networks that the terminal accesses, and store the bit rate.

Preferably, the bit rate storage module 12 is specifically configured to: if it is determined, according to the historical information, that bit rates for downloading a streaming media file by terminals of a same device type from a same source are different when the terminals access networks of a same type, select and store a lowest bit rate among the bit rates.

(7) A case in which the historical information further includes the start time and the end time for downloading a streaming media file.

The information receiving module 11 is specifically configured to receive the record information that further includes the start time and the end time for downloading a streaming media file.

The bit rate storage module 12 is specifically configured to determine, according to the record information received by the information receiving module, a bit rate for downloading a streaming media file, by the terminal of each device type when the terminal is in the various types of networks that the terminal accesses, within a time segment represented by each start time and end time, and store the bit rate.

Preferably, the bit rate storage module 12 is specifically configured to: if it is determined, according to the historical information, that bit rates for downloading a streaming media file by terminals of a same device type within a same time segment are different when the terminals access networks of a same type, select and store a lowest bit rate among the bit rates.

(8) A case in which the historical information further includes the configuration information of a terminal.

The information receiving module 11 is specifically configured to receive the historical information that further includes the configuration information of a terminal.

The bit rate storage module 12 is specifically configured to determine, according to the record information received by the information receiving module, a bit rate for downloading a streaming media file when the terminal of each device type is in the various types of networks that the terminal accesses in the case of each type of configuration information, and store the bit rate.

The foregoing solutions from (5) to (8) may be randomly combined together. The bit rate storage module 12 may perform a statistical analysis on bit rates of terminals in various cases according to a variety of information and store the bit rates.

After the bit rate storage module 12 performs the statistical analysis on the bit rates of terminals in the various cases according to a variety of information and stores the bit rates, the bit rate determining module 14 may recommend a bit rate to a terminal according to a difference in content of the request received by the request receiving module 13. Detailed descriptions are as follows:

(a) A case in which the transmission request further carries user account information.

The request receiving module 13 is configured to receive the streaming media data transmission request that further includes the user account information.

The bit rate determining module 14 is specifically configured to determine, according to the determined bit rate for downloading a streaming media file by the terminal of each device type when the terminal applies the various user account information in the various types of networks that the terminal accesses, a bit rate for downloading a streaming media file when the terminal corresponding to the device type in the transmission request accesses the network corresponding to the network type in the transmission request and applies the user account information in the transmission request.

Preferably, the bit rate determining module 14 is further configured to: if a case in which the user account information in the transmission request is applied when the terminal corresponding to the device type in the transmission request accesses the network corresponding to the network type in the transmission request is not recorded in the determined bit rate for downloading a streaming media file by the terminal of each device type when the terminal applies the various user account information in the various types of networks that the terminal accesses, determine a bit rate for the user account information in the transmission request when a terminal of another device type accesses the network corresponding to the network type in the transmission request, or a bit rate for other user account information when the terminal corresponding to the device type in the transmission request accesses the network corresponding to the network type in the transmission request.

(b) A case in which the transmission request further carries source information of a streaming media file.

The request receiving module 13 is configured to receive the streaming media data transmission request that further includes the source information of a streaming media file.

The bit rate determining module 14 is specifically configured to determine, according to the determined bit rate for downloading a streaming media file, by the terminal of each device type, from the source corresponding to each piece of source information when the terminal is in the various types of networks that the terminal accesses, a bit rate for downloading a streaming media file when the terminal corresponding to the device type in the transmission request accesses the network corresponding to the network type in the transmission request and acquires a streaming media file from a source corresponding to the source information in the transmission request.

(c) A case in which the transmission request further carries current time.

The request receiving module 13 is configured to receive the streaming media data transmission request that further includes the current time.

The bit rate determining module 14 is specifically configured to determine, according to the determined bit rate for downloading a streaming media file, by the terminal of each device type when the terminal is in the various types of networks that the terminal accesses, within the time segment represented by each start time and end time, a bit rate for downloading a streaming media file within a time segment to which the current time belongs when the terminal corresponding to the device type in the transmission request accesses the network corresponding to the network type in the transmission request.

(d) A case in which the transmission request further carries configuration information of a terminal.

The request receiving module 13 is configured to receive the streaming media data transmission request that further includes the configuration information of a terminal.

The bit rate determining module 14 is specifically configured to determine, according to the determined bit rate for downloading a streaming media file when the terminal of each device type is in the various types of networks that the terminal accesses in the case of each type of configuration information, a bit rate for downloading a streaming media file when the terminal corresponding to the device type in the transmission request accesses, based on configuration corresponding to the configuration information in the transmission request, the network corresponding to the network type in the transmission request.

The foregoing solutions from (a) to (d) may be randomly combined together. The bit rate determining module 14 may recommend a bit rate to a terminal in various states according to content obtained by means of statistical analysis.

Embodiment 10

In Embodiment 10 of the present invention, a bit rate determining device that is based on a same invention idea as Embodiment 7 is further provided. The device includes: an information receiving module, a bit rate storage module, a request receiving module, a bit rate determining module, and a bit rate sending module, where:

the information receiving module is configured to receive historical information that is of streaming media service execution within set duration and reported by a media content delivery device, where the historical information includes a device type of a terminal that executes a streaming media service, a network type of a network that the terminal accesses, and a bit rate for the terminal to download a streaming media file;

the bit rate storage module is configured to store a bit rate for downloading a streaming media file when a terminal of each device type is in various types of networks that the terminal accesses, where the bit rate is determined according to the historical information;

the request receiving module is configured to receive a streaming media data transmission request from a terminal, where the transmission request carries a device type of the terminal and a network type of a network that the terminal accesses;

the bit rate determining module is configured to determine, according to the bit rate stored in the bit rate storage module, a bit rate for downloading a streaming media file when the terminal corresponding to the device type in the transmission request accesses the network corresponding to the network type in the transmission request; and the bit rate sending module is configured to send the bit rate determined by the bit rate determining module to the terminal to instruct the terminal to determine, according to an index file, an address of streaming media data encoded at the received bit rate and acquire the streaming media data.

Preferably, when the historical information further includes downloading duration for downloading a streaming media file, the information receiving module is further configured to delete historical information that includes downloading duration less than a threshold.

In the foregoing solution, the bit rate determining device performs a statistical analysis on bit rates of terminals in various cases according to the historical information reported by the media content delivery device. In addition to a device type of a terminal and a network type of a network that the terminal accesses, the historical information may further include user account information, source information of a to-be-downloaded streaming media file, start time and end time for downloading a streaming media file, and configuration information of a terminal, which are separately described in the following.

(1) A case in which the historical information further includes the user account information.

The information receiving module is specifically configured to receive the historical information that further includes the user account information.

The bit rate storage module is specifically configured to determine, according to the historical information received by the information receiving module, a bit rate for downloading a streaming media file by the terminal of each device type when the terminal applies various user account information in the various types of networks that the terminal accesses, and store the bit rate.

Preferably, the bit rate storage module is specifically configured to: if it is determined, according to the historical information, that bit rates for downloading a streaming media file are different when terminals of a same device type access networks of a same type and apply same user account information, select and store a lowest bit rate among the bit rates.

(2) A case in which the historical information further includes the source information of a to-be-downloaded streaming media file.

The information receiving module is specifically configured to receive the historical information that further includes the source information of a to-be-downloaded streaming media file.

The bit rate storage module is specifically configured to determine, according to the record information received by the information receiving module, a bit rate for downloading a streaming media file, by the terminal of each device type, from a source corresponding to each piece of source information when the terminal is in the various types of networks that the terminal accesses, and store the bit rate.

Preferably, the bit rate storage module is specifically configured to: if it is determined, according to the historical information, that bit rates for downloading a streaming media file by terminals of a same device type from a same source are different when the terminals access networks of a same type, select and store a lowest bit rate among the bit rates.

(3) A case in which the historical information further includes the start time and the end time for downloading a streaming media file.

The information receiving module is specifically configured to receive the record information that further includes the start time and the end time for downloading a streaming media file.

The bit rate storage module is specifically configured to determine, according to the record information received by the information receiving module, a bit rate for downloading a streaming media file, by the terminal of each device type when the terminal is in the various types of networks that the terminal accesses, within a time segment represented by each start time and end time, and store the bit rate.

Preferably, the bit rate storage module is specifically configured to: if it is determined, according to the historical information, that bit rates for downloading a streaming media file by terminals of a same device type within a same time segment are different when the terminals access networks of a same type, select and store a lowest bit rate among the bit rates.

(4) A case in which the historical information further includes the configuration information of a terminal.

The information receiving module is specifically configured to receive the historical information that further includes the configuration information of a terminal.

The bit rate storage module is specifically configured to determine, according to the record information received by the information receiving module, a bit rate for downloading a streaming media file when the terminal of each device type is in the various types of networks that the terminal accesses in the case of each type of configuration information, and store the bit rate.

The foregoing solutions from (1) to (4) may be randomly combined together. The bit rate storage module may perform a statistical analysis on bit rates of terminals in various cases according to a variety of information and store the bit rates.

After the bit rate storage module performs the statistical analysis on the bit rates of terminals in the various cases according to a variety of information and stores the bit rates, the bit rate determining module may recommend a bit rate to a terminal according to a difference in content of the request received by the request receiving module. Detailed descriptions are as follows:

(a) A case in which the transmission request further carries user account information.

The request receiving module is configured to receive the streaming media data transmission request that further includes the user account information.

The bit rate determining module is specifically configured to determine, according to the determined bit rate for downloading a streaming media file by the terminal of each device type when the terminal applies the various user account information in the various types of networks that the terminal accesses, a bit rate for downloading a streaming media file when the terminal corresponding to the device type in the transmission request accesses the network corresponding to the network type in the transmission request and applies the user account information in the transmission request.

Preferably, the bit rate determining module is further configured to: if a case in which the user account information in the transmission request is applied when the terminal corresponding to the device type in the transmission request accesses the network corresponding to the network type in the transmission request is not recorded in the determined bit rate for downloading a streaming media file by the terminal of each device type when the terminal applies the various user account information in the various types of networks that the terminal accesses, determine a bit rate for the user account information in the transmission request when a terminal of another device type accesses the network corresponding to the network type in the transmission request, or a bit rate for other user account information when the terminal corresponding to the device type in the transmission request accesses the network corresponding to the network type in the transmission request.

(b) A case in which the transmission request further carries source information of a streaming media file.

The request receiving module is configured to receive the streaming media data transmission request that further includes the source information of a streaming media file.

The bit rate determining module is specifically configured to determine, according to the determined bit rate for downloading a streaming media file, by the terminal of each device type, from the source corresponding to each piece of source information when the terminal is in the various types of networks that the terminal accesses, a bit rate for downloading a streaming media file when the terminal corresponding to the device type in the transmission request accesses the network corresponding to the network type in the transmission request and acquires a streaming media file from a source corresponding to the source information in the transmission request.

(c) A case in which the transmission request further carries current time.

The request receiving module is configured to receive the streaming media data transmission request that further includes the current time.

The bit rate determining module is specifically configured to determine, according to the determined bit rate for downloading a streaming media file, by the terminal of each device type when the terminal is in the various types of networks that the terminal accesses, within the time segment represented by each start time and end time, a bit rate for downloading a streaming media file within a time segment to which the current time belongs when the terminal corresponding to the device type in the transmission request accesses the network corresponding to the network type in the transmission request.

(d) A case in which the transmission request further carries configuration information of a terminal.

The request receiving module is configured to receive the streaming media data transmission request that further includes the configuration information of a terminal.

The bit rate determining module is specifically configured to determine, according to the determined bit rate for downloading a streaming media file when the terminal of each device type is in the various types of networks that the terminal accesses in the case of each type of configuration information, a bit rate for downloading a streaming media file when the terminal corresponding to the device type in the transmission request accesses, based on configuration corresponding to the configuration information in the transmission request, the network corresponding to the network type in the transmission request.

The foregoing solutions from (a) to (d) may be randomly combined together. The bit rate determining module may recommend a bit rate to a terminal in various states according to content obtained by means of statistical analysis.

In Embodiment 10 and Embodiment 11 of the present invention, a network side (EPG for example) performs a statistical analysis according to information reported by at least one device of a terminal and a media content delivery device (MDN), and then determines a solution of recommending a bit rate to a terminal in different states.

Embodiment 11

Figure 4:
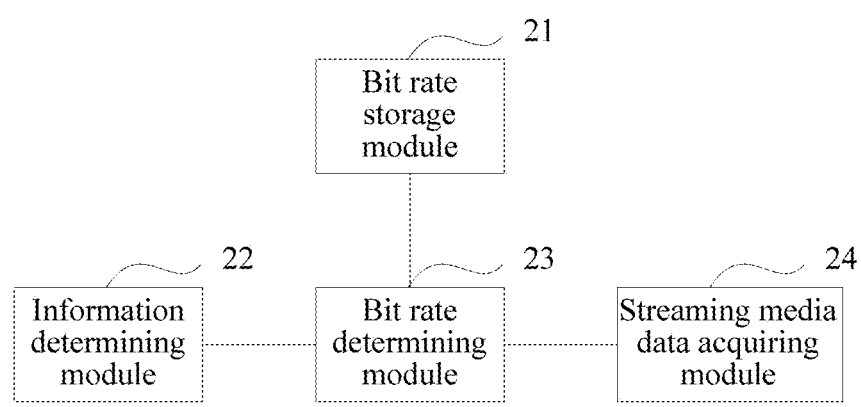
FIG. 4 is a schematic structural diagram of a terminal according to Embodiment 11.

In Embodiment 11 of the present invention, a terminal is provided in a case in which the terminal actively collects statistics on bit rates and selects a suitable bit rate to download a streaming media file. As shown in FIG. 4, the terminal includes a bit rate storage module 21, an information determining module 22, a bit rate determining module 23, and a streaming media data acquiring module 24, where:

the bit rate storage module 21 is configured to determine, according to record information of streaming media service execution, a bit rate for downloading a streaming media file when each type of network is accessed, and store the bit rate, where the record information includes a network type of a network that the terminal accesses and a bit rate for the terminal to download a streaming media file;

the information determining module 22 is configured to determine a network type of a currently accessed network;

the bit rate determining module 23 is configured to determine, according to the bit rate stored in the bit rate storage module, a bit rate for downloading a streaming media file in the currently accessed network; and the streaming media data acquiring module 24 is configured to determine, from an index file, an address of streaming media data encoded at the bit rate determined by the bit rate determining module in the currently accessed network, and acquire the streaming media data according to the determined address.

Preferably, the bit rate storage module 21 is specifically configured to: when the record information further includes downloading duration for downloading a streaming media file, delete record information that includes downloading duration less than a threshold.

In the foregoing solution, the terminal performs a statistical analysis according to a device type of the terminal and a network type of an accessed network. In addition, the terminal may further perform a statistical analysis according to user account information, source information of a to-be-downloaded streaming media file, start time and end time for downloading a streaming media file, and configuration information of the terminal, which are separately described in the following.

(1) A case in which the record information further includes the user account information.

The bit rate storage module 21 is specifically configured to separately determine, based on each type of accessed network, a bit rate for downloading a streaming media file when various user account information is applied, and store the bit rate.

Preferably, the bit rate storage module 21 is specifically configured to: if it is determined, according to the record information, that bit rates for downloading a streaming media file are different when networks of a same type are accessed and same user account information is applied, select and store a lowest bit rate among the bit rates.

(2) A case in which the record information further includes the source information of a to-be-downloaded streaming media file.

The bit rate storage module 21 is specifically configured to separately determine, based on each type of accessed network, a bit rate for downloading a streaming media file from a source corresponding to each piece of source information.

Preferably, the bit rate storage module 21 is specifically configured to: if it is determined, according to the record information, that bit rates for downloading a streaming media file from a same source are different when networks of a same type are accessed, select and store a lowest bit rate among the bit rates.

(3) A case in which the record information further includes the start time and the end time for downloading a streaming media file.

The bit rate storage module 21 is specifically configured to separately determine, based on each type of accessed network, a bit rate for downloading a streaming media file within a time segment represented by each start time and end time, and store the bit rate.

Preferably, the bit rate storage module 21 is specifically configured to: if it is determined, according to the record information, that bit rates for downloading a streaming media file within a same time segment are different when networks of a same type are accessed, select and store a lowest bit rate among the bit rates.

(4) A case in which the record information further includes the configuration information of the terminal.

The bit rate storage module 21 is specifically configured to separately determine a bit rate for downloading a streaming media file when a terminal of each device type is in each type of network that the terminal accesses in the case of each type of configuration information, and store the bit rate.

The foregoing solutions from (1) to (4) may be randomly combined together. The bit rate storage module 12 may perform a statistical analysis on bit rates in various cases according to a variety of information and store the bit rates.

In the solution of Embodiment 11, the information determining module 22 is further configured to determine at least one type of currently used user account information, source information of a to-be-downloaded streaming media file, start time and end time for downloading a streaming media file, and configuration information of a terminal. Information actually determined herein by the information determining module 22 matches the information included in the record information in the foregoing (1) to (4). The bit rate determining module 23 is further configured to determine, according to the bit rates that are stored in the bit rate storage module and determined according to the foregoing (1) to (4), bit rates for downloading a streaming media file in the currently accessed network and based on information added in (1) to (4).

Embodiment 12

Figure 5:
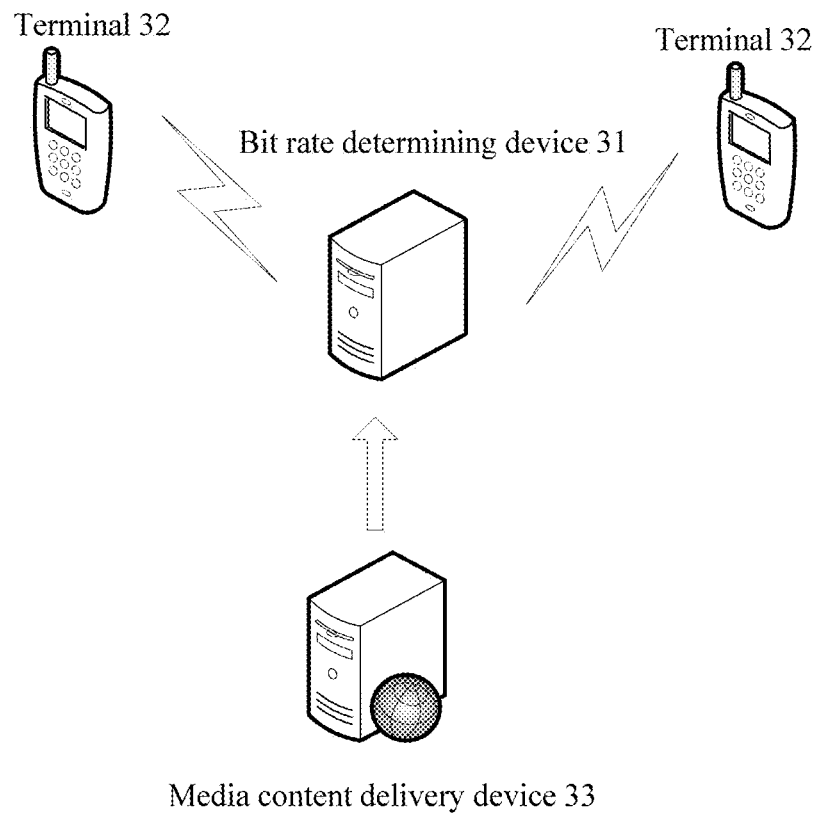
FIG. 5 is a schematic structural diagram of a system for acquiring streaming media data according to Embodiment 12.

FIG. 5 is a schematic structural diagram of a system for acquiring streaming media data according to Embodiment 12 of the present invention. The system includes a bit rate determining device 31 and at least one terminal 32.

The terminal 32 is configured to: report record information of streaming media service execution to the bit rate determining device 31, after initiating a streaming media data transmission request to the bit rate determining device 31, receive a bit rate sent by the bit rate determining device 31, determine, according to an index file, an address of streaming media data encoded at the received bit rate, and acquire the streaming media data, where the record information includes a device type of the terminal, a network type of a network that the terminal accesses, and a bit rate for the terminal to download a streaming media file.

The bit rate determining device 31 is configured to: determine, according to the record information, a bit rate for downloading a streaming media file when a terminal of each device type is in various types of networks that the terminal accesses; when receiving the streaming media data transmission request that carries a device type of the terminal and a network type of a network that the terminal accesses, determine, according to the determined bit rate for downloading a streaming media file when the terminal of each device type is in the various types of networks that the terminal accesses, a bit rate for downloading a streaming media file when the terminal corresponding to the device type in the transmission request accesses the network corresponding to the network type in the transmission request; and send the bit rate to the terminal 32.

The record information reported by the terminal 32 to the bit rate determining device 31 may further include at least one piece of user account information, source information of a to-be-downloaded streaming media file, start time and end time for downloading a streaming media file, and configuration information of a terminal. The bit rate determining device 31 performs a statistical analysis on bit rates for a terminal in different states according to the record information that includes the foregoing information, and details are not described herein again.

The system further includes a media content delivery device 33.

The media content delivery device 33 is configured to report, to the bit rate determining device 31, historical information of streaming media service execution within set duration, where the historical information includes a device type of a terminal that executes a streaming media service, a network type of a network that the terminal accesses, and a bit rate for the terminal to download a streaming media file.

The bit rate determining device 31 is further configured to receive the historical information reported by the media content delivery device 33, and separately determine, according to the historical information, a bit rate for downloading a streaming media file when the terminal of each device type is in the various types of networks that the terminal accesses.

The historical information reported by the media content delivery device 33 to the bit rate determining device 31 may further include at least one piece of user account information, source information of a to-be-downloaded streaming media file, start time and end time for downloading a streaming media file, and configuration information of a terminal. The bit rate determining device 31 performs a statistical analysis on bit rates for a terminal in different states according to the historical information that includes the foregoing information, and details are not described herein again.

Embodiment 13

In Embodiment 13 of the present invention, a system for acquiring streaming media data is further provided, and the system includes a bit rate determining device, a media content delivery device, and at least one terminal, where:

the media content delivery device is configured to report, to the bit rate determining device, historical information of streaming media service execution within set duration, where the historical information includes a device type of a terminal that executes a streaming media service, a network type of a network that the terminal accesses, and a bit rate for the terminal to download a streaming media file;

the bit rate determining device is configured to: determine, according to the historical information, a bit rate for downloading a streaming media file when a terminal of each device type is in various types of networks that the terminal accesses; when receiving a streaming media data transmission request that carries a device type of the terminal and a network type of a network that the terminal accesses, determine, according to the determined bit rate for downloading a streaming media file when the terminal of each device type is in the various types of networks that the terminal accesses, a bit rate for downloading a streaming media file when the terminal corresponding to the device type in the transmission request accesses the network corresponding to the network type in the transmission request; and send the bit rate to the terminal; and the terminal is configured to: after initiating the streaming media data transmission request to the bit rate determining device, receive the bit rate sent by the bit rate determining device; determine, according to an index file, an address of streaming media data encoded at the received bit rate; and acquire the streaming media data.

The historical information reported by the media content delivery device to the bit rate determining device may further include at least one piece of user account information, source information of a to-be-downloaded streaming media file, start time and end time for downloading a streaming media file, and configuration information of a terminal. The bit rate determining device performs a statistical analysis on bit rates for a terminal in different states according to the historical information that includes the foregoing information, and details are not described herein again.

Embodiment 14

Figure 6:
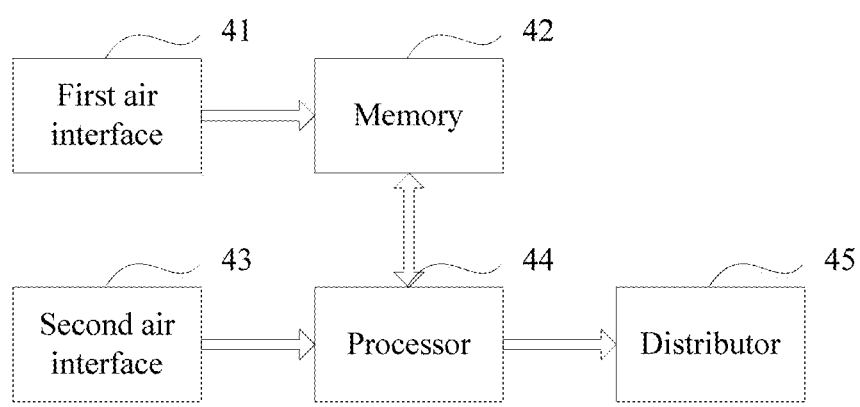
FIG. 6 is a schematic structural diagram of a bit rate determining device according to Embodiment 14.

In Embodiment 14 of the present invention, a bit rate determining device is further provided. As shown in FIG. 6, the device includes a first air interface 41, a memory 42, a second air interface 43, a processor 44, and a distributor 45, where:

the first air interface 41 is configured to receive record information that is of streaming media service execution and reported by each terminal, where the record information includes a device type of the terminal, a network type of a network that the terminal accesses, and a bit rate for the terminal to download a streaming media file;

the memory 42 is configured to store a bit rate for downloading a streaming media file when a terminal of each device type is in various types of networks that the terminal accesses, where the bit rate is determined according to the record information received by the first air interface 41;

the second air interface 43 is configured to receive a streaming media data transmission request from the terminal, where the transmission request carries a device type of the terminal and a network type of a network that the terminal accesses;

the processor 44 is configured to determine, according to the bit rate stored in the memory 42, a bit rate for downloading a streaming media file when the terminal corresponding to the device type in the transmission request accesses the network corresponding to the network type in the transmission request; and the distributor 45 is configured to send the bit rate determined by the processor 44 to the terminal to instruct the terminal to determine, according to an index file, an address of streaming media data encoded at the received bit rate and acquire the streaming media data.

Preferably, the memory 42 is specifically configured to: if it is determined, according to the record information, that bit rates for downloading a streaming media file are different when terminals of a same device type access networks of a same type, select a lowest bit rate among the bit rates for storage.

The record information further includes downloading duration for downloading a streaming media file. In this case, the first air interface 41 is specifically configured to: after receiving the record information reported by the terminal, delete record information that includes downloading duration less than a threshold.

In Embodiment 14 of the present invention, a statistical analysis on bit rates is performed based on a device type of a terminal and a network type of an accessed network. In Embodiment 14, on such a basis, a statistical analysis may further be performed by using user account information, source information of a to-be-downloaded streaming media file, start time and end time for downloading a streaming media file, configuration information of a terminal, and other parameters, which are separately described in the following.

(1) A case in which the record information further includes the user account information.

The first air interface 41 is specifically configured to receive the record information that further includes the user account information.

The memory 42 is specifically configured to determine, according to the record information received by the information receiving module, a bit rate for downloading a streaming media file by the terminal of each device type when the terminal applies various user account information in the various types of networks that the terminal accesses, and store the bit rate.

Preferably, the memory 42 is specifically configured to: if it is determined, according to the record information, that bit rates for downloading a streaming media file are different when terminals of a same device type access networks of a same type and apply same user account information, select and store a lowest bit rate among the bit rates.

(2) A case in which the record information further includes the source information of a to-be-downloaded streaming media file.

The first air interface 41 is specifically configured to receive the record information that further includes the source information of a to-be-downloaded streaming media file.

The memory 42 is specifically configured to determine, according to the record information received by the information receiving module, a bit rate for downloading a streaming media file, by the terminal of each device type, from a source corresponding to each piece of source information when the terminal is in the various types of networks that the terminal accesses, and store the bit rate.

Preferably, the memory 42 is specifically configured to: if it is determined, according to the record information, that bit rates for downloading a streaming media file by terminals of a same device type from a same source are different when the terminals access networks of a same type, select and store a lowest bit rate among the bit rates.

(3) A case in which the record information further includes the start time and the end time for downloading a streaming media file.

The first air interface 41 is specifically configured to receive the record information that further includes the start time and the end time for downloading a streaming media file.

The memory 42 is specifically configured to determine, according to the record information received by the information receiving module, a bit rate for downloading a streaming media file, by the terminal of each device type when the terminal is in the various types of networks that the terminal accesses, within a time segment represented by each start time and end time, and store the bit rate.

Preferably, the memory 42 is specifically configured to: if it is determined, according to the record information, that bit rates for downloading a streaming media file by terminals of a same device type within a same time segment are different when the terminals access networks of a same type, select and store a lowest bit rate among the bit rates.

(4) A case in which the record information further includes the configuration information of a terminal.

The first air interface 41 is specifically configured to receive the record information that further includes the configuration information of a terminal.

The memory 42 is specifically configured to determine, according to the record information received by the information receiving module, a bit rate for downloading a streaming media file when the terminal of each device type is in the various types of networks that the terminal accesses in the case of each type of configuration information.

The foregoing solutions from (1) to (4) may be randomly combined together. The memory 42 may perform a statistical analysis on bit rates of terminals in various cases according to a variety of information and store the bit rates.

In the foregoing solutions, the bit rate determining device performs a statistical analysis on bit rates of terminals in various cases according to record information reported by the terminals. In the solution of this embodiment, the bit rate determining device may further perform a statistical analysis on bit rates of terminals in various cases according to historical information reported by a media content delivery device. Detailed descriptions are as follows:

The first air interface 41 is further configured to receive historical information that is of streaming media service execution within set duration and reported by the media content delivery device, where the historical information includes a device type of a terminal that executes a streaming media service, a network type of a network that the terminal accesses, and a bit rate for the terminal to download a streaming media file.

The memory 42 is further configured to store a bit rate for downloading a streaming media file when the terminal of each device type is in the various types of networks that the terminal accesses, where the bit rate is determined according to the historical information.

Preferably, when the historical information further includes downloading duration for downloading a streaming media file, the first air interface 41 is further configured to delete historical information that includes downloading duration less than a threshold.

Similar to the foregoing solutions from (1) to (4), the historical information may further include user account information, source information of a to-be-downloaded streaming media file, start time and end time for downloading a streaming media file, and configuration information of a terminal, which are separately described in the following.

(5) A case in which the historical information further includes the user account information.

The first air interface 41 is specifically configured to receive the historical information that further includes the user account information.

The memory 42 is specifically configured to determine, according to the historical information received by the information receiving module, a bit rate for downloading a streaming media file by the terminal of each device type when the terminal applies various user account information in the various types of networks that the terminal accesses, and store the bit rate.

Preferably, the memory 42 is specifically configured to: if it is determined, according to the historical information, that bit rates for downloading a streaming media file are different when terminals of a same device type access networks of a same type and apply same user account information, select and store a lowest bit rate among the bit rates.

(6) A case in which the historical information further includes the source information of a to-be-downloaded streaming media file.

The first air interface 41 is specifically configured to receive the historical information that further includes the source information of a to-be-downloaded streaming media file.

The memory 42 is specifically configured to determine, according to the record information received by the information receiving module, a bit rate for downloading a streaming media file, by the terminal of each device type, from a source corresponding to each piece of source information when the terminal is in the various types of networks that the terminal accesses, and store the bit rate.

Preferably, the memory 42 is specifically configured to: if it is determined, according to the historical information, that bit rates for downloading a streaming media file by terminals of a same device type from a same source are different when the terminals access networks of a same type, select and store a lowest bit rate among the bit rates.

(7) A case in which the historical information further includes the start time and the end time for downloading a streaming media file.

The first air interface 41 is specifically configured to receive the record information that further includes the start time and the end time for downloading a streaming media file.

The memory 42 is specifically configured to determine, according to the record information received by the information receiving module, a bit rate for downloading a streaming media file, by the terminal of each device type when the terminal is in the various types of networks that the terminal accesses, within a time segment represented by each start time and end time, and store the bit rate.

Preferably, the memory 42 is specifically configured to: if it is determined, according to the historical information, that bit rates for downloading a streaming media file by terminals of a same device type within a same time segment are different when the terminals access networks of a same type, select and store a lowest bit rate among the bit rates.

(8) A case in which the historical information further includes the configuration information of a terminal.

The first air interface 41 is specifically configured to receive the historical information that further includes the configuration information of a terminal.

The memory 42 is specifically configured to determine, according to the record information received by the information receiving module, a bit rate for downloading a streaming media file when the terminal of each device type is in the various types of networks that the terminal accesses in the case of each type of configuration information, and store the bit rate.

The foregoing solutions from (5) to (8) may be randomly combined together. The memory 42 may perform a statistical analysis on bit rates of terminals in various cases according to a variety of information and store the bit rates.

After the memory 42 performs the statistical analysis on the bit rates of terminals in the various cases according to a variety of information and stores the bit rates, the processor 44 may recommend a bit rate to a terminal according to a difference in content of the request received by the second air interface 43. Detailed descriptions are as follows:

(a) A case in which the transmission request further carries user account information.

The second air interface 43 is configured to receive the streaming media data transmission request that further includes the user account information.

The processor 44 is specifically configured to determine, according to the determined bit rate for downloading a streaming media file by the terminal of each device type when the terminal applies the various user account information in the various types of networks that the terminal accesses, a bit rate for downloading a streaming media file when the terminal corresponding to the device type in the transmission request accesses the network corresponding to the network type in the transmission request and applies the user account information in the transmission request.

Preferably, the processor 44 is further configured to: if a case in which the user account information in the transmission request is applied when the terminal corresponding to the device type in the transmission request accesses the network corresponding to the network type in the transmission request is not recorded in the determined bit rate for downloading a streaming media file by the terminal of each device type when the terminal applies the various user account information in the various types of networks that the terminal accesses, determine a bit rate for the user account information in the transmission request when a terminal of another device type accesses the network corresponding to the network type in the transmission request, or a bit rate for other user account information when the terminal corresponding to the device type in the transmission request accesses the network corresponding to the network type in the transmission request.

(b) A case in which the transmission request further carries source information of a streaming media file.

The second air interface 43 is configured to receive the streaming media data transmission request that further includes the source information of a streaming media file.

The processor 44 is specifically configured to determine, according to the determined bit rate for downloading a streaming media file, by the terminal of each device type, from the source corresponding to each piece of source information when the terminal is in the various types of networks that the terminal accesses, a bit rate for downloading a streaming media file when the terminal corresponding to the device type in the transmission request accesses the network corresponding to the network type in the transmission request and acquires a streaming media file from a source corresponding to the source information in the transmission request.

(c) A case in which the transmission request further carries current time.

The second air interface 43 is configured to receive the streaming media data transmission request that further includes the current time.

The processor 44 is specifically configured to determine, according to the determined bit rate for downloading a streaming media file, by the terminal of each device type when the terminal is in the various types of networks that the terminal accesses, within the time segment represented by each start time and end time, a bit rate for downloading a streaming media file within a time segment to which the current time belongs when the terminal corresponding to the device type in the transmission request accesses the network corresponding to the network type in the transmission request.

(d) A case in which the transmission request further carries configuration information of a terminal.

The second air interface 43 is configured to receive the streaming media data transmission request that further includes the configuration information of a terminal.

The processor 44 is specifically configured to determine, according to the determined bit rate for downloading a streaming media file when the terminal of each device type is in the various types of networks that the terminal accesses in the case of each type of configuration information, a bit rate for downloading a streaming media file when the terminal corresponding to the device type in the transmission request accesses, based on configuration corresponding to the configuration information in the transmission request, the network corresponding to the network type in the transmission request.

The foregoing solutions from (a) to (d) may be randomly combined together. The processor 44 may recommend a bit rate to a terminal in various states according to content obtained by means of statistical analysis.

Embodiment 15

In Embodiment 15 of the present invention, a bit rate determining device is further provided. The device includes a first air interface, a memory, a second air interface, a processor, and a distributor.

The first air interface is configured to receive historical information that is of streaming media service execution within set duration and reported by a media content delivery device, where the historical information includes a device type of a terminal that executes a streaming media service, a network type of a network that the terminal accesses, and a bit rate for the terminal to download a streaming media file.

The memory is configured to store a bit rate for downloading a streaming media file when a terminal of each device type is in various types of networks that the terminal accesses, where the bit rate is determined according to the historical information.

The second air interface is configured to receive a streaming media data transmission request from a terminal, where the transmission request carries a device type of the terminal and a network type of a network that the terminal accesses.

The processor is configured to determine, according to the bit rate stored in the bit rate storage module, a bit rate for downloading a streaming media file when the terminal corresponding to the device type in the transmission request accesses the network corresponding to the network type in the transmission request.

The distributor is configured to send the bit rate determined by the bit rate determining module to the terminal to instruct the terminal to determine, according to an index file, an address of streaming media data encoded at the received bit rate and acquire the streaming media data.

Preferably, when the historical information further includes downloading duration for downloading a streaming media file, the first air interface is further configured to delete historical information that includes downloading duration less than a threshold.

In the foregoing solution, the bit rate determining device performs a statistical analysis on bit rates of terminals in various cases according to the historical information reported by the media content delivery device. In addition to the foregoing statistical analysis performed on a device type of a terminal and a network type of a network that the terminal accesses, the historical information may further include user account information, source information of a to-be-downloaded streaming media file, start time and end time for downloading a streaming media file, and configuration information of a terminal, which are separately described in the following.

(1) A case in which the historical information further includes the user account information.

The first air interface is specifically configured to receive the historical information that further includes the user account information.

The memory is specifically configured to determine, according to the historical information received by the information receiving module, a bit rate for downloading a streaming media file by the terminal of each device type when the terminal applies various user account information in the various types of networks that the terminal accesses, and store the bit rate.

Preferably, the memory is specifically configured to: if it is determined, according to the historical information, that bit rates for downloading a streaming media file are different when terminals of a same device type access networks of a same type and apply same user account information, select and store a lowest bit rate among the bit rates.

(2) A case in which the historical information further includes the source information of a to-be-downloaded streaming media file.

The first air interface is specifically configured to receive the historical information that further includes the source information of a to-be-downloaded streaming media file.

The memory is specifically configured to determine, according to the record information received by the information receiving module, a bit rate for downloading a streaming media file, by the terminal of each device type, from a source corresponding to each piece of source information when the terminal is in the various types of networks that the terminal accesses, and store the bit rate.

Preferably, the memory is specifically configured to: if it is determined, according to the historical information, that bit rates for downloading a streaming media file by terminals of a same device type from a same source are different when the terminals access networks of a same type, select and store a lowest bit rate among the bit rates.

(3) A case in which the historical information further includes the start time and the end time for downloading a streaming media file.

The first air interface is specifically configured to receive the record information that further includes the start time and the end time for downloading a streaming media file.

The memory is specifically configured to determine, according to the record information received by the information receiving module, a bit rate for downloading a streaming media file, by the terminal of each device type when the terminal is in the various types of networks that the terminal accesses, within a time segment represented by each start time and end time, and store the bit rate.

Preferably, the memory is specifically configured to: if it is determined, according to the historical information, that bit rates for downloading a streaming media file by terminals of a same device type within a same time segment are different when the terminals access networks of a same type, select and store a lowest bit rate among the bit rates.

(4) A case in which the historical information further includes the configuration information of a terminal.

The first air interface is specifically configured to receive the historical information that further includes the configuration information of a terminal.

The memory is specifically configured to determine, according to the record information received by the information receiving module, a bit rate for downloading a streaming media file when the terminal of each device type is in the various types of networks that the terminal accesses in the case of each type of configuration information, and store the bit rate.

The foregoing solutions from (1) to (4) may be randomly combined together. The memory may perform a statistical analysis on bit rates of terminals in various cases according to a variety of information and store the bit rates.

After the memory performs the statistical analysis on the bit rates of terminals in the various cases according to a variety of information and stores the bit rates, the processor may recommend a bit rate to a terminal according to a difference in content of the request received by the second air interface. Detailed descriptions are as follows:

(a) A case in which the transmission request further carries user account information.

The second air interface is configured to receive the streaming media data transmission request that further includes the user account information.

The processor is specifically configured to determine, according to the determined bit rate for downloading a streaming media file by the terminal of each device type when the terminal applies the various user account information in the various types of networks that the terminal accesses, a bit rate for downloading a streaming media file when the terminal corresponding to the device type in the transmission request accesses the network corresponding to the network type in the transmission request and applies the user account information in the transmission request.

Preferably, the processor is further configured to: if a case in which the user account information in the transmission request is applied when the terminal corresponding to the device type in the transmission request accesses the network corresponding to the network type in the transmission request is not recorded in the determined bit rate for downloading a streaming media file by the terminal of each device type when the terminal applies the various user account information in the various types of networks that the terminal accesses, determine a bit rate for the user account information in the transmission request when a terminal of another device type accesses the network corresponding to the network type in the transmission request, or a bit rate for other user account information when the terminal corresponding to the device type in the transmission request accesses the network corresponding to the network type in the transmission request.

(b) A case in which the transmission request further carries source information of a streaming media file.

The second air interface is configured to receive the streaming media data transmission request that further includes the source information of a streaming media file.

The processor is specifically configured to determine, according to the determined bit rate for downloading a streaming media file, by the terminal of each device type, from the source corresponding to each piece of source information when the terminal is in the various types of networks that the terminal accesses, a bit rate for downloading a streaming media file when the terminal corresponding to the device type in the transmission request accesses the network corresponding to the network type in the transmission request and acquires a streaming media file from a source corresponding to the source information in the transmission request.

(c) A case in which the transmission request further carries current time.

The second air interface is configured to receive the streaming media data transmission request that further includes the current time.

The processor is specifically configured to determine, according to the determined bit rate for downloading a streaming media file, by the terminal of each device type when the terminal is in the various types of networks that the terminal accesses, within the time segment represented by each start time and end time, a bit rate for downloading a streaming media file within a time segment to which the current time belongs when the terminal corresponding to the device type in the transmission request accesses the network corresponding to the network type in the transmission request.

(d) A case in which the transmission request further carries configuration information of a terminal.

The second air interface is configured to receive the streaming media data transmission request that further includes the configuration information of a terminal.

The processor is specifically configured to determine, according to the determined bit rate for downloading a streaming media file when the terminal of each device type is in the various types of networks that the terminal accesses in the case of each type of configuration information, a bit rate for downloading a streaming media file when the terminal corresponding to the device type in the transmission request accesses, based on configuration corresponding to the configuration information in the transmission request, the network corresponding to the network type in the transmission request.

The foregoing solutions from (a) to (d) may be randomly combined together. The processor may recommend a bit rate to a terminal in various states according to content obtained by means of statistical analysis.

Embodiment 16

Figure 7:
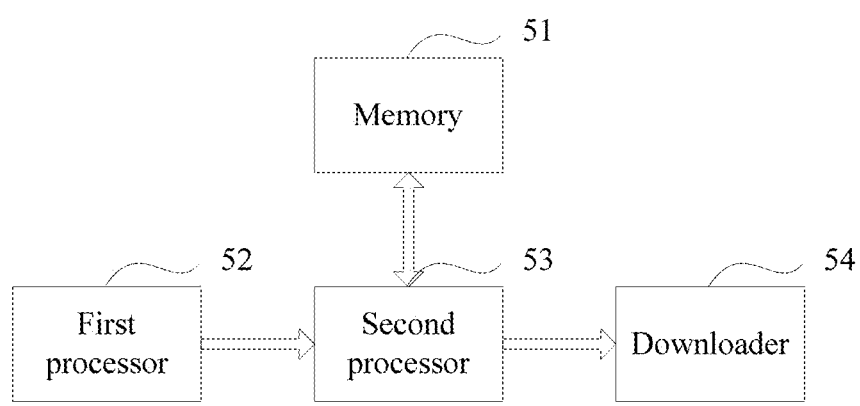
FIG. 7 is a schematic structural diagram of a terminal according to Embodiment 16.

In Embodiment 16 of the present invention, a terminal is provided. As shown in FIG. 7, the terminal includes a memory 51, a first processor 52, a second processor 53, and a downloader 54, where:

the memory 51 is configured to determine, according to record information of streaming media service execution, a bit rate for downloading a streaming media file when each type of network is accessed, and store the bit rate, where the record information includes a network type of a network that the terminal accesses and a bit rate for the terminal to download a streaming media file;

the first processor 52 is configured to determine a network type of a currently accessed network;

the second processor 53 is configured to determine, according to the bit rate stored in the memory 51, a bit rate for downloading a streaming media file in the currently accessed network; and the downloader 54 is configured to determine, from an index file, an address of streaming media data encoded at the bit rate determined by the bit rate determining module in the currently accessed network, and acquire the streaming media data according to the determined address.

Preferably, the memory 51 is specifically configured to: when the record information further includes downloading duration for downloading a streaming media file, delete record information that includes downloading duration less than a threshold.

In the foregoing solution, the terminal performs a statistical analysis according to a device type of the terminal and a network type of an accessed network. In addition, the terminal may further perform a statistical analysis according to user account information, source information of a to-be-downloaded streaming media file, start time and end time for downloading a streaming media file, and configuration information of the terminal, which are separately described in the following.

(1) A case in which the record information further includes the user account information.

The memory 51 is specifically configured to separately determine, based on each type of accessed network, a bit rate for downloading a streaming media file when various user account information is applied, and store the bit rate.

Preferably, the memory 51 is specifically configured to: if it is determined, according to the record information, that bit rates for downloading a streaming media file are different when networks of a same type are accessed and same user account information is applied, select and store a lowest bit rate among the bit rates.

(2) A case in which the record information further includes the source information of a to-be-downloaded streaming media file.

The memory 51 is specifically configured to separately determine, based on each type of accessed network, a bit rate for downloading a streaming media file from a source corresponding to each piece of source information.

Preferably, the memory 51 is specifically configured to: if it is determined, according to the record information, that bit rates for downloading a streaming media file from a same source are different when networks of a same type are accessed, select and store a lowest bit rate among the bit rates.

(3) A case in which the record information further includes the start time and the end time for downloading a streaming media file.

The memory 51 is specifically configured to separately determine, based on each type of accessed network, a bit rate for downloading a streaming media file within a time segment represented by each start time and end time, and store the bit rate.

Preferably, the memory 51 is specifically configured to: if it is determined, according to the record information, that bit rates for downloading a streaming media file within a same time segment are different when networks of a same type are accessed, select and store a lowest bit rate among the bit rates.

(4) A case in which the record information further includes the configuration information of a terminal.

The memory 51 is specifically configured to separately determine a bit rate for downloading a streaming media file when a terminal of each device type is in each type of network that the terminal accesses in the case of each type of configuration information, and store the bit rate.

The foregoing solutions from (1) to (4) may be randomly combined together. The memory 51 may perform a statistical analysis on bit rates in various cases according to a variety of information and store the bit rates.

In addition to the network type of the currently accessed network, the first processor 52 may further determine at least one type of user account information, source information of a to-be-downloaded streaming media file, start time and end time for downloading a streaming media file, and configuration information of a terminal. Then the second processor 53 determines a suitable bit rate for itself according to the bit rates, stored in the memory 51, in various states.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for acquiring streaming media data, comprising:
    receiving a streaming media data transmission request from a terminal, wherein the streaming media data transmission request comprises a device type of the terminal and a network type of a network that the terminal accesses;
    determining, according to the device type of the terminal, the network type of the network that the terminal accesses, and a mapping of a plurality of bit rates to a plurality of device type and network type combinations, a bit rate for downloading a streaming media file for the terminal; and
    sending the bit rate to the terminal to instruct the terminal to determine, according to an index file, an address of streaming media data encoded at the bit rate, and acquire the streaming media data using the determined address;
    wherein the mapping of the plurality of bit rates to the plurality of device type and network type combinations is determined according to record information of streaming media service execution that have occurred prior to the streaming media data transmission request, the record information being reported by a plurality of terminals, and wherein the record information comprises:
        a respective device type of each of the plurality of terminals;
        a respective network type of a respective network that each of the plurality of terminals accesses; and
        a respective bit rate for each of the plurality of terminals to download a streaming media file.

2. The method according to claim 1, wherein the record information further comprises user account information; and wherein the method further comprises:
    determining, according to the record information, a mapping of the plurality of bit rates to various user account information.

3. The method according to claim 2, wherein the transmission request further comprises user account information of the terminal; and
    wherein determining, according to the device type of the terminal, the network type of the network that the terminal accesses, and the mapping of the plurality of bit rates to the plurality of device type and network type combinations, the bit rate for downloading the streaming media file comprises:
    determining, according to the user account information of the terminal and the mapping of the plurality of bit rates to the various user account information, the bit rate for downloading the streaming media file.

4. The method according to claim 3, wherein the record information is absent a mapping of a particular bit rate to a combination of the device type of the terminal, the network type in the transmission request, and the user account information of the terminal; and
    wherein determining, according to the device type of the terminal, the network type in the transmission request, the user account information of the terminal, the mapping of the plurality of bit rates to the plurality of device type and network type combinations, and the mapping of the plurality of bit rates to the various user account information, the bit rate for downloading the streaming media file comprises determining the bit rate according to:
        a mapping of a bit rate to a device type other than the device type of the terminal; or
        a mapping of a bit rate to a combination of the device type of the terminal, the network type in transmission request, and user account information different than the user account information of the terminal.

5. The method according to claim 1, wherein the record information further comprises a respective configuration information type of each of the plurality of terminals; and
    wherein the method further comprises:
    determining, according to the record information, a mapping of the plurality of bit rates to a plurality of configuration information types.

6. The method according to claim 5, wherein the transmission request further comprises configuration information of a terminal; and
    wherein determining, according to the device type of the terminal, the network type of the network that the terminal accesses, and the mapping of the plurality of bit rates to the plurality of device type and network type combinations, the bit rate for downloading the streaming media file comprises:
    determining, according to the configuration information of the terminal and the mapping of the plurality of bit rates to the plurality of configuration information types, the bit rate for downloading the streaming media file.

7. The method according to claim 1, wherein receiving the record information further comprises receiving a downloading duration for downloading a streaming media file; and
    after the record information reported by a terminal is received, and before determining, according to the record information, the mapping of the plurality of bit rates to the plurality of device type and network type combinations, the method further comprises:
    deleting record information that comprises a downloading duration that is less than a threshold from the record information.

8. The method according to claim 1, further comprising:
receiving historical information of streaming media service execution within a set duration and reported by a media content delivery device, wherein the historical information comprises a device type of a terminal that executes a streaming media service, a network type of a network that the terminal accesses, and a bit rate for the terminal to download a streaming media file; and
determining, according to the historical information, the mapping of the plurality of bit rates to the plurality of device type and network type combinations.

9. A method for acquiring streaming media data, comprising:
determining, by a terminal, a network type of a network currently accessed by the terminal;
determining, according to the network type and a mapping of a plurality of bit rates to a plurality of network types, a bit rate for downloading a streaming media file in the network;
determining, by the terminal according to an index file, an address of streaming media data encoded at the bit rate for downloading a streaming media file in the network; and
acquiring, by the terminal, the streaming media data according to the determined address;
wherein the mapping of the plurality of bit rates to the plurality of network types is determined according to record information of streaming media service execution that have occurred prior to determining the address of the streaming media data, the record information being obtained from the terminal, wherein the record information comprises:
a plurality of network types that the terminals accesses; and
a respective bit rate used by the terminal to download a streaming media file in each of the plurality of network types.

10. The method of claim 9, wherein the record information is obtained from a plurality of terminals, and wherein the record information comprises:
a respective device type of each of the plurality of terminals;
a respective network type of a respective network that each of the plurality of terminals accesses; and
a respective bit rate for each of the plurality of terminals to download a streaming media file.

11. A system for acquiring streaming media data, comprising:
a terminal, comprising a processor and a computer-readable storage medium storing a program to be executed by the processor, the program including instructions for:
initiating a streaming media data transmission request to a bit rate determining device;
receiving a bit rate sent by the bit rate determining device;
determining, according to an index file, an address of streaming media data encoded at the received bit rate;
acquiring the streaming media data; and
reporting record information of streaming media service execution to the bit rate determining device prior to initiating the streaming media data transmission request, the record information comprising a device type of the terminal, a network type of a network that the terminal accesses, and a bit rate for the terminal to download a streaming media file; and
a bit rate determining device, comprising a processor and a computer-readable storage medium storing a program to be executed by the processor, the program including instructions for:
determining, according to the record information, a mapping of a plurality of bit rates to a plurality of device type and network type combinations;
determining, in response to receiving the streaming media data transmission request that carries a device type of the terminal and a network type of a network that the terminal accesses, and according to the mapping of the plurality of bit rates to the plurality of device type and network type combinations, a bit rate for downloading a streaming media file for the terminal; and
send the bit rate to the terminal.

12. The system according to claim 11, wherein the system further comprises:
a media content delivery device, comprising a processor and a computer-readable storage medium storing a program to be executed by the processor, the program including instructions for reporting, to the bit rate determining device, historical information of streaming media service execution within a set duration, wherein the historical information comprises a device type of a terminal that executes a streaming media service, a network type of a network that the terminal accesses, and a bit rate for the terminal to downloading a streaming media file; and
wherein the program of the bit rate determining device further includes instructions for receiving the historical information reported by the media content delivery device, and separately determining, according to the historical information, the mapping of the plurality of bit rates to the plurality of device type and network type combinations.

13. A system for acquiring streaming media data, comprising:
a bit rate determining device, comprising a processor and a computer-readable storage medium storing a program to be executed by the processor, the program including instructions for:
determining, according to historical information, a mapping of a plurality of bit rates to a plurality of device type and network type combinations;
determining, in response to receiving a streaming media data transmission request that carries a device type of a terminal and a network type of a network that the terminal accesses, according to the device type of the terminal, the network type of the network that the terminal accesses, and the mapping of the plurality of bit rates to the plurality of device type and network type combinations, a bit rate for downloading a streaming media file for the terminal; and
sending the bit rate to the terminal;
a media content delivery device, comprising a processor and a computer-readable storage medium storing a program to be executed by the processor, the program including instructions for:
reporting, to the bit rate determining device, the historical information of streaming media service execution by a plurality of terminals within a set duration, wherein the historical information is obtained from the plurality of terminals and comprises:
a respective device type of each of the plurality off terminals;

a respective network type of a respective network that each of the plurality of terminals accesses; and a respective bit rate for each of the plurality of terminals to download a streaming media file; and a terminal, comprising a processor and a computer-readable storage medium storing a program to be executed by the processor, the program including instructions for:

initiating the streaming media data transmission request to the bit rate determining device;

receiving the bit rate sent by the bit rate determining device;

determining, according to an index file, an address of streaming media data encoded at the received bit rate; and acquiring the streaming media data.

14. The system of claim 13, wherein the historical information further comprises various user account information of the plurality of terminals or a respective configuration information type of each of the plurality of terminals, and wherein the bit rate is further determined according to a mapping of the plurality of bit rates to the various user account information or a mapping of the plurality of bit rates to a plurality of configuration information types, the mapping of the plurality of bit rates to the various user account information is determined according to the historical information, the mapping of the plurality of bit rates to a plurality of configuration information types is determined according to the historical information.

15. A device, comprising:

a processor; and a non-transitory computer readable memory storing programing for execution by the processor, the programing including instructions to:

receive a streaming media data transmission request from a terminal, wherein the streaming media data transmission request comprises a device type of the terminal and a network type of a network that the terminal accesses;

determine, according to the device type of the terminal, the network type of the network that the terminal accesses, and a mapping of a plurality of bit rates to a plurality of device type and network type combinations, a bit rate for downloading a streaming media file for the terminal; and send the bit rate to the terminal to instruct the terminal to determine, according to an index file, an address of streaming media data encoded at the bit rate, and acquire the streaming media data using the determined address;

wherein the mapping of the plurality of bit rates to the plurality of device type and network type combinations is determined according to record information of streaming media service execution that have occurred prior to the streaming media data transmission request, the record information being reported by a plurality of terminals, wherein the record information comprises:

a respective device type of each of the plurality of terminals;

a respective network type of a respective network that each of the plurality of terminals accesses; and a respective bit rate for each of the plurality of terminals to download a streaming media file.

16. The device of claim 15, wherein the record information further comprises various user account information of the plurality of terminals or a respective configuration information type of each of the plurality of terminals, and wherein the bit rate is further determined according to a mapping of the plurality of bit rates to the various user account information or a mapping of the plurality of bit rates to a plurality of configuration information types, the mapping of the plurality of bit rates to the various user account information is determined according to the record information , the mapping of the plurality of bit rates to a plurality of configuration information types is determined according to the record information.

17. A terminal, comprising:

a processor; and a non-transitory computer readable memory storing programing for execution by the processor, the programing including instructions to:

determine, by a terminal, a network type of a network currently accessed by the terminal;

determine, according to the network type and a mapping of a plurality of bit rates to a plurality of network types, a bit rate for downloading a streaming media file in the network;

determine, by the terminal according to an index file, an address of streaming media data encoded at the bit rate for downloading a streaming media file in the network; and acquire, by the terminal, the streaming media data according to the determined address;

wherein the mapping of the plurality of bit rates to the plurality of network types is determined according to record information of streaming media service execution that have occurred prior to determining the address of the streaming media data, the record information being obtained from the terminal, wherein the record information comprises:

a plurality of network types that the terminals accesses; and a respective bit rate used by the terminal to download a streaming media file in each of the plurality of network types.

18. The terminal of claim 17, wherein the record information is obtained from a plurality of terminals, and wherein the record information comprises:

a respective device type of each of the plurality of terminals;

a respective network type of a respective network that each of the plurality of terminals accesses; and a respective bit rate for each of the plurality of terminals to download a streaming media file.

* * * * *